United States Patent
Takahashi et al.

(10) Patent No.: US 7,733,859 B2
(45) Date of Patent: Jun. 8, 2010

(54) APPARATUS AND METHOD FOR PACKET FORWARDING IN LAYER 2 NETWORK

(75) Inventors: Tadashi Takahashi, Yokohama (JP); Hiroaki Miyata, Yokohama (JP); Takashi Yokoyama, Yokohama (JP); Masanori Kamata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 11/751,158

(22) Filed: May 21, 2007

(65) Prior Publication Data

US 2007/0274290 A1 Nov. 29, 2007

(30) Foreign Application Priority Data

May 22, 2006 (JP) .............................. 2006-141455

(51) Int. Cl.
H04L 12/28 (2006.01)
(52) U.S. Cl. ......................... 370/389; 370/351; 370/401
(58) Field of Classification Search ....................... None
See application file for complete search history.

(56) References Cited

U.S. PATENT DOCUMENTS 7,409,451 B1 * 8/2008 Meenan et al. ............... 709/227
2003/0182434 A1 * 9/2003 Ogushi et al. ............... 709/228
2005/0041671 A1 * 2/2005 Ikeda et al. ............ 370/395.52

FOREIGN PATENT DOCUMENTS

| JP | 2003-060675 | 2/2003 |
|---|---|---|
| JP | 2003-224577 | 8/2003 |
| JP | 2004-304574 | 10/2004 |

* cited by examiner

*Primary Examiner*—Ayaz R Sheikh
*Assistant Examiner*—Nicholas Sloms
(74) *Attorney, Agent, or Firm*—Mattingly & Malur, P.C.

(57) ABSTRACT

A packet forwarding apparatus with a function of registering packet forwarding control information for each user terminal into a user management table during PPPoE connection and authentication phases in which the apparatus carries out predetermined communication procedures with each user terminal. During DHCP and IP forwarding phases following the authentication phase, the packet forwarding apparatus controls packet forwarding based on the user management table. Packets are forwarded in the form of PPPoE frame until the authentication phase is completed and packets are forwarded in the form of Ethernet frame in the DHCP and IP forwarding phases.

13 Claims, 19 Drawing Sheets

PPPoE FRAME 70

ETHERNET FRAME 74

TERMINAL MANAGEMENT TABLE 25

| | 251<br>L2GW<br>MAC ADDRESS | 252<br>SESSION<br>ID | 253<br>AUTHENTICATION<br>RESULT | 254<br>IP ADDRESS | 255<br>STATUS |
|---|---|---|---|---|---|
| EN(1) | — | — | — | — | PADO WAITING |
| EN(2) | 00-00-87-00-00-14 | — | — | — | PADO WAITING |
| EN(3) | 00-00-87-00-00-14 | — | — | — | PADS WAITING |
| EN(4) | 00-00-87-00-00-14 | 1 | — | — | LCP |
| EN(5) | 00-00-87-00-00-14 | 1 | — | — | AUTHENTICATION |
| EN(6) | 00-00-87-00-00-14 | 1 | AUTHENTICATION OK | — | DHCP |
| EN(7) | 00-00-87-00-00-14 | 1 | AUTHENTICATION OK | 192.168.0.1 | IP FORWARDING |
| EN(8) | — | — | — | — | — |

FIG. 7A

USER MANAGEMENT TABLE 17

| USER SIDE PORT NUMBER 171 | TERMINAL MAC ADDRESS 172 | SESSION ID 173 | AUTHENTICATION RESULT 174 |
|---|---|---|---|
| PU1 | 00-00-87-00-00-11 | 1 | |
| | ⋮ | ⋮ | ⋮ |
| PU2 | ⋮ | ⋮ | ⋮ |
| ⋮ | ⋮ | ⋮ | ⋮ |

FIG. 7B

| USER SIDE PORT NUMBER 171 | TERMINAL MAC ADDRESS 172 | SESSION ID 173 | AUTHENTICATION RESULT 174 |
|---|---|---|---|
| PU1 | 00-00-87-00-00-11 | 1 | AUTHENTICATION OK |
| | ⋮ | ⋮ | ⋮ |
| PU2 | ⋮ | ⋮ | ⋮ |
| ⋮ | ⋮ | ⋮ | ⋮ |

PORT MANAGEMENT TABLE 18

FIG. 8A

| L2 NETWORK SIDE PORT NUMBER (181) | SOURCE MAC ADDRESS (182) |
|---|---|
| PL1 | |
| ⋮ | ⋮ |
| PLn | 00-00-87-00-00-17 (DHCP) |

FIG. 8B

| L2 NETWORK SIDE PORT NUMBER (181) | SOURCE MAC ADDRESS (182) |
|---|---|
| PL1 | |
| ⋮ | ⋮ |
| PLn | 00-00-87-00-00-17 (DHCP)<br>00-00-87-00-00-18 (ROUTER) |

APPARATUS AND METHOD FOR PACKET FORWARDING IN LAYER 2 NETWORK

CLAIM OF PRIORITY

The present application claims priority from Japanese application serial No. 2006-141455, filed on May 22, 2006, the content of which is hereby incorporated by reference into this application.

BACKGROUND OF THE INVENTION (1) Field of the Invention

The present invention relates to a packet forwarding system and, more particularly, to a packet forwarding apparatus and system forming a layer 2 network and to a packet forwarding method.

(2) Description of Related Art

Nowadays, an authentication-based Internet connection service using high-speed access lines, such as Asymmetric Digital Subscriber Line (ADSL), Fiber to The Home (FTTH), and wireless Local Area Network (LAN) has come into popular use and a communication environment enabling efficient transfer of a large volume of content data to user terminals is being developed. Each user terminal is connected via a high-speed access line to a Broadband Access Server (BAS) located as a high-speed access network termination node in a transit network which is operated by an Internet Service Provider (ISP) or a communications company.

The BAS terminates communication protocols such as a Point to Point Protocol over Ethernet (PPPoE) and a Point to Point Protocol (PPP) for establishing a connection between terminals and sends an authentication request for a terminal user to an authentication server such as a Remote Authentication Dial-In User Service (RADIUS) server. Upon receiving successful user authentication result from the RADIUS, the BAS notifies the user terminal of information for layer 3 network connection, such as an IP address. By applying the connection information (the IP address) notified from the BAS to transmission packets, the user terminal becomes able to perform layer 3 packet transmission over the Internet. In this way, an authentication based high-speed Internet connection service is carried out.

In such high-speed remote access service, however, the transit network imposes restrictions on the layer 3 packet forwarding service and the service provider is not always able to provide a communication service desired by users. For example, in a case where a user wishes to perform communication by the latest Internet Protocol Version 6 (IPv6) or a special protocol for a general purpose computers if a layer 3 network forming the transit network cannot support such protocol, the user cannot use the desired communication protocol. When the PPPoE is used, for example, the PPPoE header restricts transmission packet length. In some situation, a forwarding packet has to be fragmented when the BAS encapsulates the packet with the PPPoE header and this may result in a decrease in data transfer efficiency.

Meanwhile, because a protocol-free layer 2 network is free of such a problem as discussed above, a new authentication and connection service is being launched to connect above-mentioned high-speed access lines to a transit network comprising of an Ethernet network via a layer 2 packet forwarding node (hereinafter referred to as L2GW). In the authentication and connection service at the layer 2 level, each user terminal sends a user authentication request to the L2GW, using a communication protocol according to an IEEE (the Institute of Electrical and Electronic Engineers) 802.1X. When succeeded in user authentication, layer 2 network connection and layer 2 packet forwarding can be carried out between the user terminal and the Ethernet network as the transit network.

Japanese Published Unexamined Patent Application No. 2003-224577 proposes a packet (Ethernet frame) relay node for connecting each user terminal to the Internet based on a general Ethernet protocol, wherein an ISP performs user authentication according to IEEE 802.1X protocol and delivers an Internet Protocol (IP) address to an authenticated user terminal, using, e.g., a Dynamic Host Configuration Protocol (DHCP) or an Internet Protocol Control Protocol (IPCP).

The layer 3 network connection service now in use applies the PPPoE protocol to connection control between a BAS and each user terminal. In this case, it is possible to take redundant BAS configuration and load distribution by locating multiple BASs in the same layer 3 network. In the case of PPPoE, each user can specify a BAS to which a PPPoE session should be connected, by designating a service name the user desired in a service name field of a PPPoE Active Discovery Initiation (PADI) packet that is initially transmitted from the user terminal. However, when the PPPoE protocol is applied to set up a connection between a user terminal and a BAS (ISP network), a PPPoE header must be attached to each communication packet transmitted in an IP forwarding phase. This poses a problem of decreasing the efficiency of data transmission across the access network and transit network.

On the other hand, in the case of the layer 2 connection service using IEEE 802.1X, as descried in Japanese Published Unexamined Patent Application No. 2003-224577, since the connection between each user terminal and a frame relay node is fixed in a one-to-one static relation, it is difficult to adopt a redundant configuration in L2GW function by using a plurality of L2GWs in order to distribute L2GW load. Accordingly, each user cannot specify a server to be connected with the user terminal by designating a service name in the manner using PPPoE.

SUMMARY OF THE INVENTION

An object of the present invention is to provide a packet forwarding apparatus and a packet forwarding system capable of adopting a redundant configuration of packet relay nodes and improving the efficiency of data transmission across an access network and a transit network.

Another object of the present invention is to provide a packet forwarding method effective between a user terminal and a packet forwarding apparatus to improve the efficiency of data transmission across an access network and a transit network.

In order to achieve the above objects, a packet forwarding apparatus of the present invention registers packet forwarding control information for each user terminal into a user management table during Point to Point over Ethernet (PPPoE) connection phase and authentication phase to be carried out with the user terminal. During Dynamic Host Configuration Protocol (DHCP) phase following the authentication phase and during Internet Protocol (IP) forwarding phase, the apparatus controls packet forwarding based on the user management table.

The packet forwarding apparatus of the present invention communicates control packets in the form of PPPoE frame having a PPPoE header in the PPPoE connection phase, LCP connection phase, and authentication phase, and communicates control packets and IP packets in the form of Ethernet frame having no PPPoE header in the DHCP phase and the IP forwarding phase.

More specifically, the packet forwarding apparatus of the present invention comprises a plurality of user connection line interfaces each connected to an access line; a plurality of transit network line interfaces each connected to a transit line; a protocol processor for carrying out communication control procedures with each user terminal connected via one of the user connection line interfaces during a Point to Point over Ethernet (PPPoE) connection phase, a Link Control Protocol (LCP) connection phase, an authentication phase, and a Dynamic Host Configuration Protocol (DHCP) phase; and a user management table indicating packet forwarding control information for each user terminal.

The protocol processor is configured to add, to the user management table during execution of the PPPoE phase communication procedure with each user terminal, a new table entry indicating the relation between a user terminal MAC address and a session ID and to register a user terminal authentication result into the table entry during the authentication phase. The protocol processor controls packet forwarding between the user connection line interfaces and the transit network line interfaces by referring to the user management table during the DHCP phase and a subsequent Internet Protocol (IP) forwarding phase.

The protocol processor communicates with, for example, an authentication server via one of the transit network line interfaces during the authentication phase and registers an authentication result received from the authentication server into the user management table. The protocol processor also communicates with a DHCP server via one of the transit network line interfaces during the DHCP phase and notifies the user terminal of an IP address received from the DHCP server. The protocol processor discards a frame whose destination address or source address is a terminal MAC address not registered in the user management table or a terminal MAC address for which a successful authentication result is not registered in the user management table, among Ethernet frames received during the DHCP phase and the IP forwarding phase.

A packet forwarding system of the present invention comprises a first layer 2 gateway and a second layer 2 gateway each being connected to a plurality of user terminals via at least one layer 2 switch in an access network; a first layer 2 switch and second layer 2 switch in a transit network, each of the first and second layer 2 switches being connected to the first and second layer 2 gateways and to a communication node apparatus on the Internet side; an authentication server connected to the first layer 2 switch; and a DHCP server connected to the second layer 2 switch.

Each of the first and second layer 2 gateways includes a protocol processor for carrying out communication procedures with each user terminal during a Point to Point over Ethernet (PPPoE) connection phase, a Link Control Protocol (LCP) connection phase, an authentication phase, and a Dynamic Host Configuration Protocol (DHCP) phase, and a user management table indicating packet forwarding control information for each user terminal.

The protocol processor is configured to add, to the user management table during execution of the PPPoE phase communication procedure with each user terminal, a new table entry indicating the relation between a user terminal MAC address and a session ID and to register a user terminal authentication result into the table entry during the authentication phase, and the protocol processor controls forwarding of packets received from said layer 2 switches in the access network and in the transit network by referring to the user management table during the DHCP phase and a subsequent Internet Protocol (IP) forwarding phase. The protocol processor communicates control packets in the form of PPPoE frame having a PPPoE header with each user terminal during the PPPoE connection phase, the LCP connection phase, and the authentication phase, and communicates control packets in the form of Ethernet frame having no PPPoE header with each user terminal during the DHCP phase and the IP forwarding phase.

Further, a packet forwarding method of the present invention includes the steps of:

carrying out a communication control procedure in a Point to Point over Ethernet (PPPoE) connection phase between a user terminal and packet forwarding apparatus and notifying a session ID from the packet forwarding apparatus to the user terminal;

carrying out communication control procedures in a Link Control Protocol (LCP) connection phase and an authentication phase between the user terminal and the packet forwarding apparatus, using PPPoE frames having a PPPoE header including the session ID;

carrying out a communication control procedure in a Dynamic Host Configuration Protocol (DHCP) phase between the user terminal and the packet forwarding apparatus, using Ethernet frames having no PPPoE header, and notifying an IP address from the packet forwarding apparatus to the user terminal; and communicating packets in an Internet Protocol (IP) forwarding phase among the user terminal, the packet forwarding apparatus, and the communication node apparatus on the Internet side, using Ethernet frames without the PPPoE header.

In a conventional transit network (ISP network), a BAS having established a PPPoE session with a user terminal carries out, following the authentication phase, a communication control procedure in a Network Control Protocol (NCP) phase such as an Internet Protocol Control Protocol (IPCP) with the user terminal, thereby to forward IP packets in the form of PPPoE frame.

Compared with this, in the present invention, the packet forwarding apparatus (L2GW) registers packet forwarding control information for each user terminal with which a PPPoE session was established into the user management table and notifies an IP address to the user terminal during the communication control procedure in the DHCP phase instead of the conventional NCP phase, so that IP packets can be forwarded during the IP forwarding phase in the form of Ethernet frame having no PPPoE header.

According to the present invention, since a user terminal attempting to access the Internet can first issue a connection request to the packet forwarding apparatus (L2GW) by PPPoE, it is possible to realize a redundant configuration having a plurality of L2GWs within the transit network. Further, as IP packets are forwarded in the form of Ethernet frame during the IP forwarding phase, the payload length in each frame can be extended for the length of the missing PPPoE header and the efficiency of data transmission across the access network and the transit network can be improved.

BRIEF DESCRIPTION OF THE DRAWINGS

FIGS. 7A and 7B illustrate a structure of and status change in a user management table 17 provided in the L2GW;

FIGS. 8A and 8B illustrate a structure of and status change in a port management table provided in the L2GW;

DETAILED DESCRIPTION OF PREFERRED EMBODIMENTS

An embodiment of a packet forwarding system of the present invention will now be described in detail with reference to the drawings.

Figure 1:
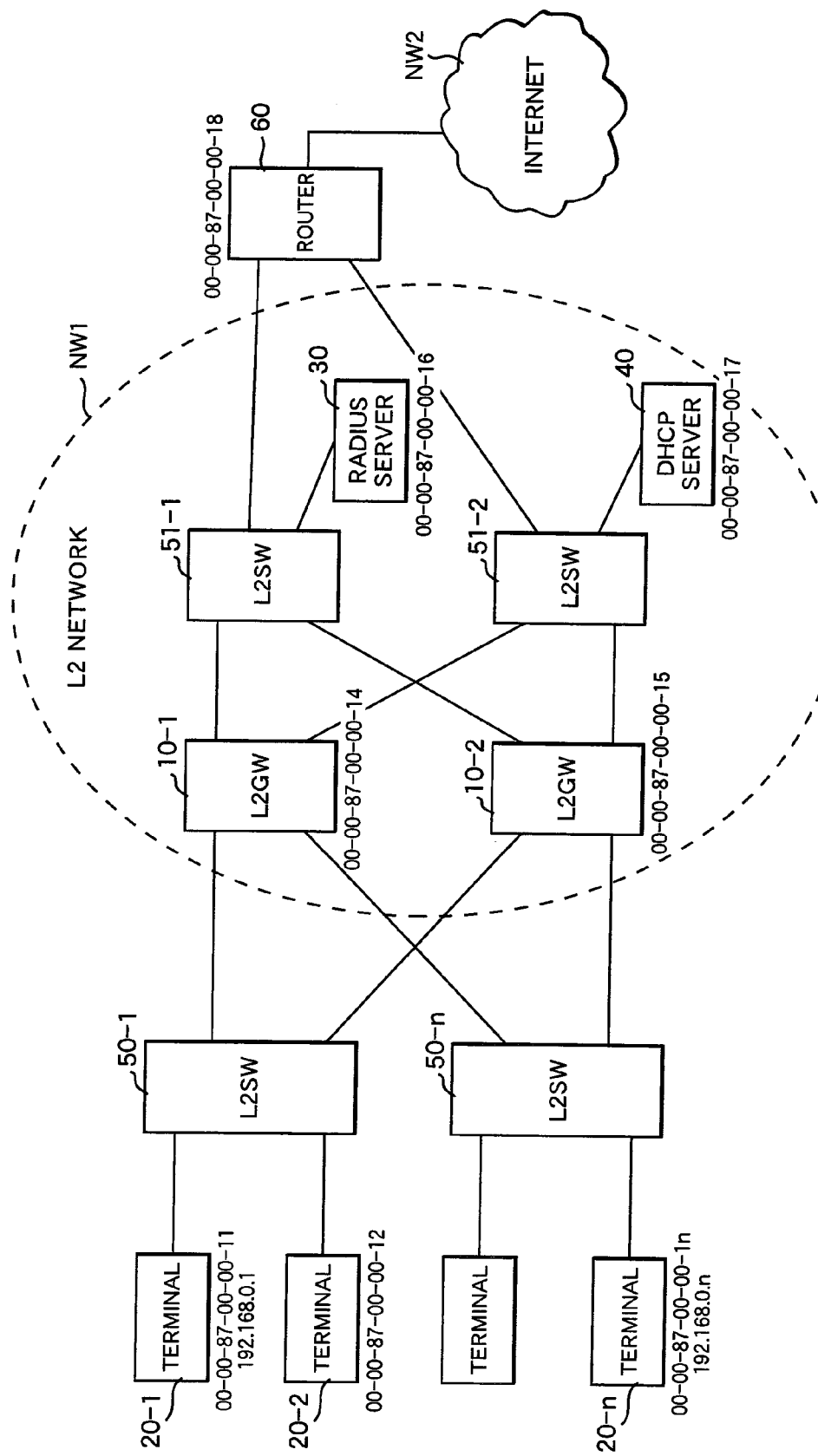
FIG. 1 shows an example of a configuration of a network to which the present invention is applied.

FIG. 1 shows an example of a configuration of a communication network to which the present invention is applied. The communication network shown here comprises a plurality of L2SWs 50 (50-1, 50-n) forming an access network and a transit network (ISP network) NW1 to which these L2SWs 50 are connected. Each L2SW accommodates at least one user terminal 20 (20-1 to 20-n).

The transit network (ISP network) NW1 is connected to the Internet NW2 via a router 60. Here, the transit network NW1 is an L2 network for forwarding packets according to a layer 2 header. The transit network NW1 includes an L2SW 51-1 connected to a RADIUS server 30, an L2SW 51-2 connected to a DHCP server 40, and a plurality of packet forwarding apparatus (nodes) L2GWs 10 (10-1, 10-2).

Each L2SW 50 forming the access network is connected to the multiple L2GWs 10-1, 10-2 within the transit network. To each L2GW 10, however, two or more L2SWs 50 in the access network can be connected. Each L2GW 10 is connected to a plurality of L2SWs 51 (51-1, 51-2) within the transit network and each L2SW 51 within the transit network is connected to the Internet NW2 via the router 60.

In FIG. 1, strings "xx-xx-xx-xx-xx-xx" appended to the user terminals 20, L2GWs 10, servers 30 and 40, and router 60 denote their MAC addresses and strings "xxx.xxx.x.x" appended to the user terminals 20 denote IP addresses assigned to these terminals.

Figure 2A:
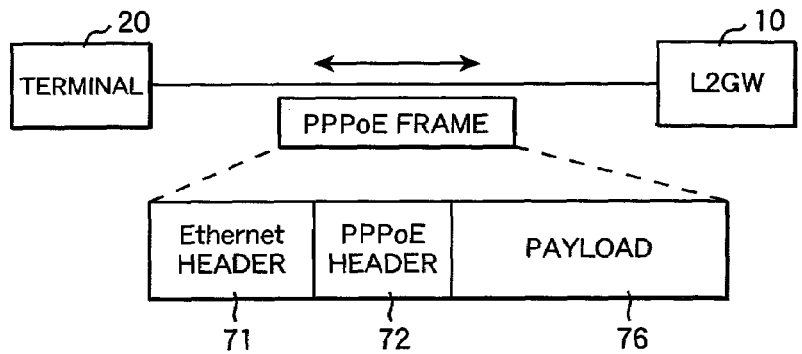
FIGS. 2A through 2C illustrate the formats of communication frames used in the present invention.

FIG. 2A illustrates a format of a communication frame to be communicated between a user terminal 20 and an L2GW 10 during a PPPoE connection phase S1 and a PPPoE disconnection phase S7 which will be described later. The communication frame for the PPPoE connection phase and the PPPoE disconnection phase is comprised of a variable length payload 76 including a control packet, and an Ethernet header 71 and a PPPoE header 72 added to the payload.

Figure 2B:
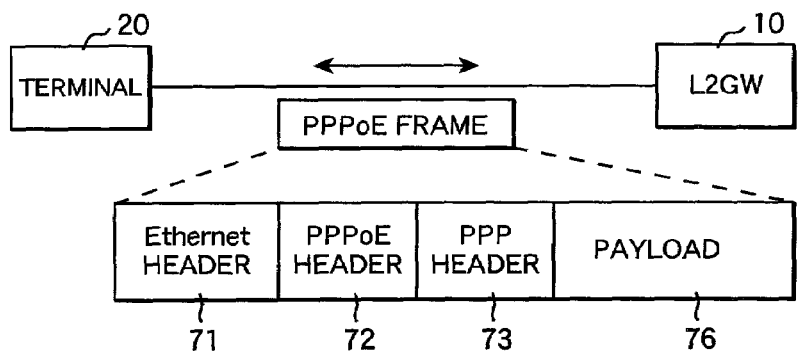

FIG. 2B illustrates a format of a communication frame to be communicated between a user terminal 20 and an L2GW 10 during an LCP connection phase S3, an authentication phase S4, and an LCP disconnection phase S6 which will be described later. The communication frame for these phases is comprised of a variable length payload 76 including a control packet, and an Ethernet header 71, a PPPoE header 72, and a PPP header 73 added to the payload.

Figure 2C:
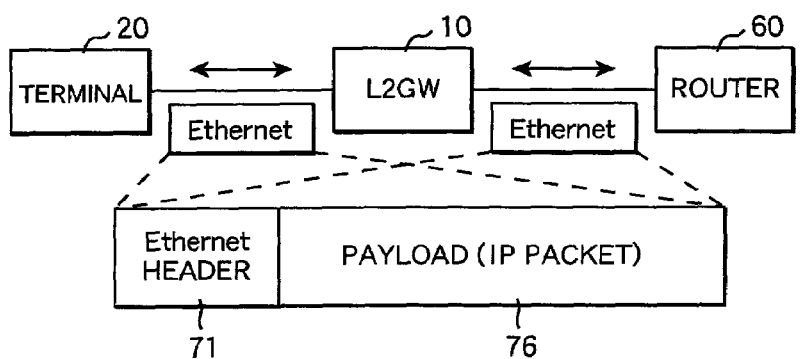

FIG. 2C illustrates a format of a communication frame to be transmitted and received by an L2GW 10 during a DHCP phase S4 and an IP forwarding phase S5 which will be described later. The communication frame for these phases is comprised of a variable length payload 76 and an Ethernet header 71.

Figure 3A:
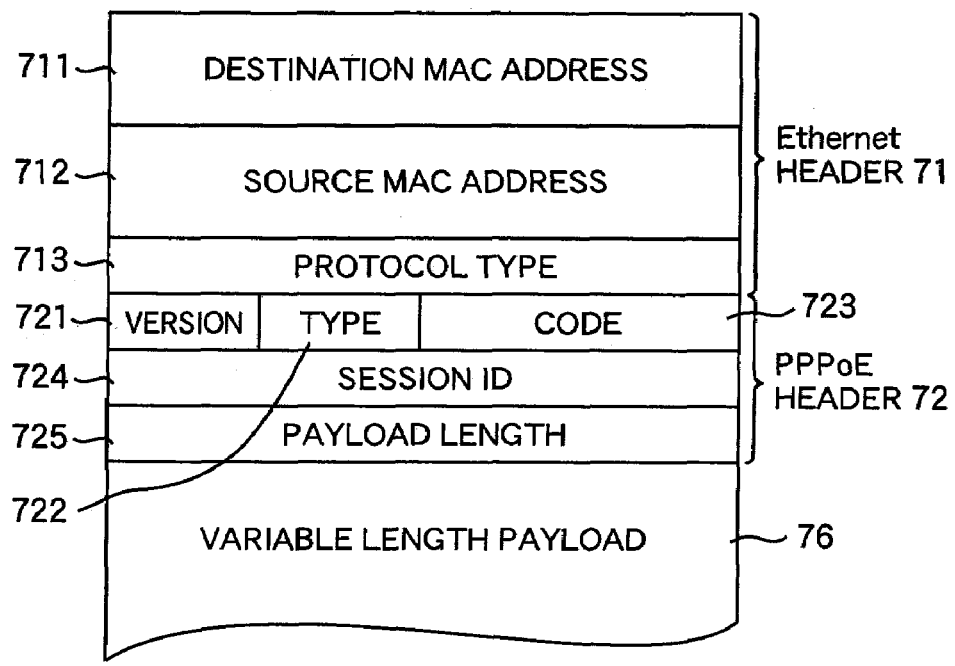
FIG. 3A illustrates a PPPoE frame format and FIG. 3B illustrates an Ethernet frame format.

FIG. 3A illustrates details of the Ethernet header 71 and the PPPoE header 72 of a communication frame 70 for the PPPoE phase. The Ethernet header 71 includes a destination MAC address 711, a source MAC address 712, and a protocol type 713. The PPPoE header 72 includes a protocol version 721, a type 722, a code 723, a session ID 724, and a payload length 725.

Figure 3B:
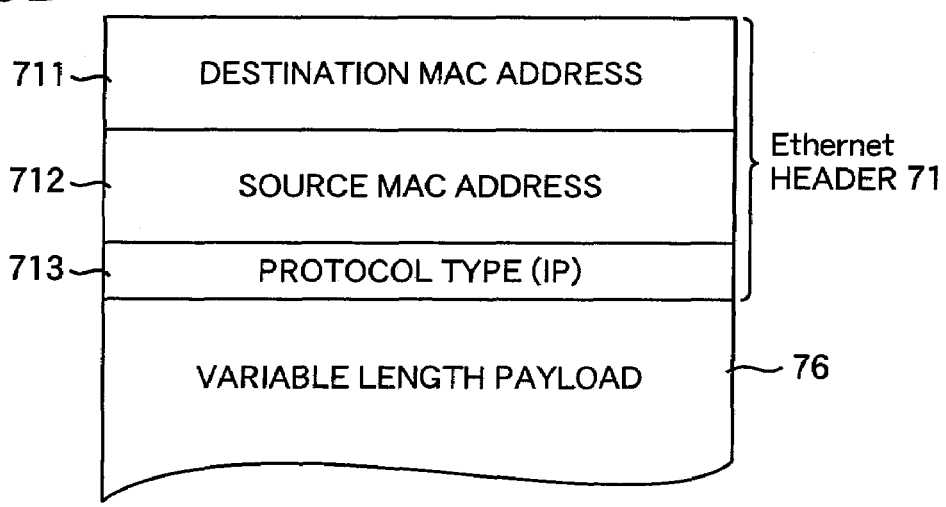

FIG. 3B illustrates a format of a communication frame (Ethernet frame) 74 to be forwarded by an L2GW 10 during the DHCP phase S4 and the IP forwarding phase S5. The communication frame 74 includes a variable length payload 76 and an Ethernet header 71. The variable length payload 76 includes a control packet or an IP packet, and the Ethernet header 71 includes a destination MAC address 711, a source MAC address 712, and a protocol type 713.

In the present specification, a frame comprising a variable length payload 76 and an Ethernet header 71, as shown in FIGS. 2C and 3B, which is controlled so as to be forwarded according to the destination MAC address specified in the Ethernet header 71, is referred to as an Ethernet frame. A frame including a PPPoE header 72, as shown in FIGS. 2A, 2B, and 3A, which is controlled so as to be forwarded according to the session ID specified in the PPPoE header 72, is referred to as a PPPoE frame.

Figures 4, 5:
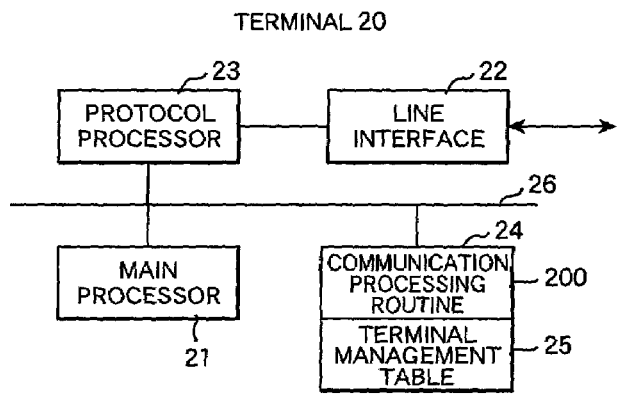
FIG. 4 is a block diagram showing a configuration of a user terminal.
FIG. 5 illustrates a structure of and status change in a terminal management table 25 provided in the user terminal.

FIG. 4 is a block structural diagram showing a primary part of the user terminal 20. The user terminal 20 comprises a main processor (controller) 21 for controlling operations of the terminal, a line interface 22 for connection to an L2SW 50, a protocol processor 23 connected to the line interface 22, a memory 24, and an internal bus 26. Additionally, the user terminal 20 is equipped with a display unit serving as a user interface and an I/O unit such as a keyboard, but these elements are omitted from the drawing because they do not directly relate to operation of the present invention. In the memory 24, a communication processing routine 200 and a terminal management table 25 are prepared as software relevant to the present invention.

AS shown in FIG. 5, the terminal management table 25 stores an L2GW MAC address 251 of an L2GW to which a PPPoE session is connected, a session ID 252, authentication result 253, an IP address 254 assigned to a user terminal, and status 255 in communication control. Usage of the terminal management table 25 will be detailed later.

The main processor 21 executes the communication processing routine 200 in response to a user's input operation and carries out communication control procedures for each of the PPPoE connection/disconnection phases, LCP connection/disconnection phases, DHCP phase, and IP forwarding phase, using the terminal management table 25. The protocol processor 23 outputs a control packet or a data packet issued by the main processor 21 to the line interface 22 in a frame format according to the communication control phase; whereas, it passes a frame received from the line interface 22 to the main processor 21.

Figure 6:
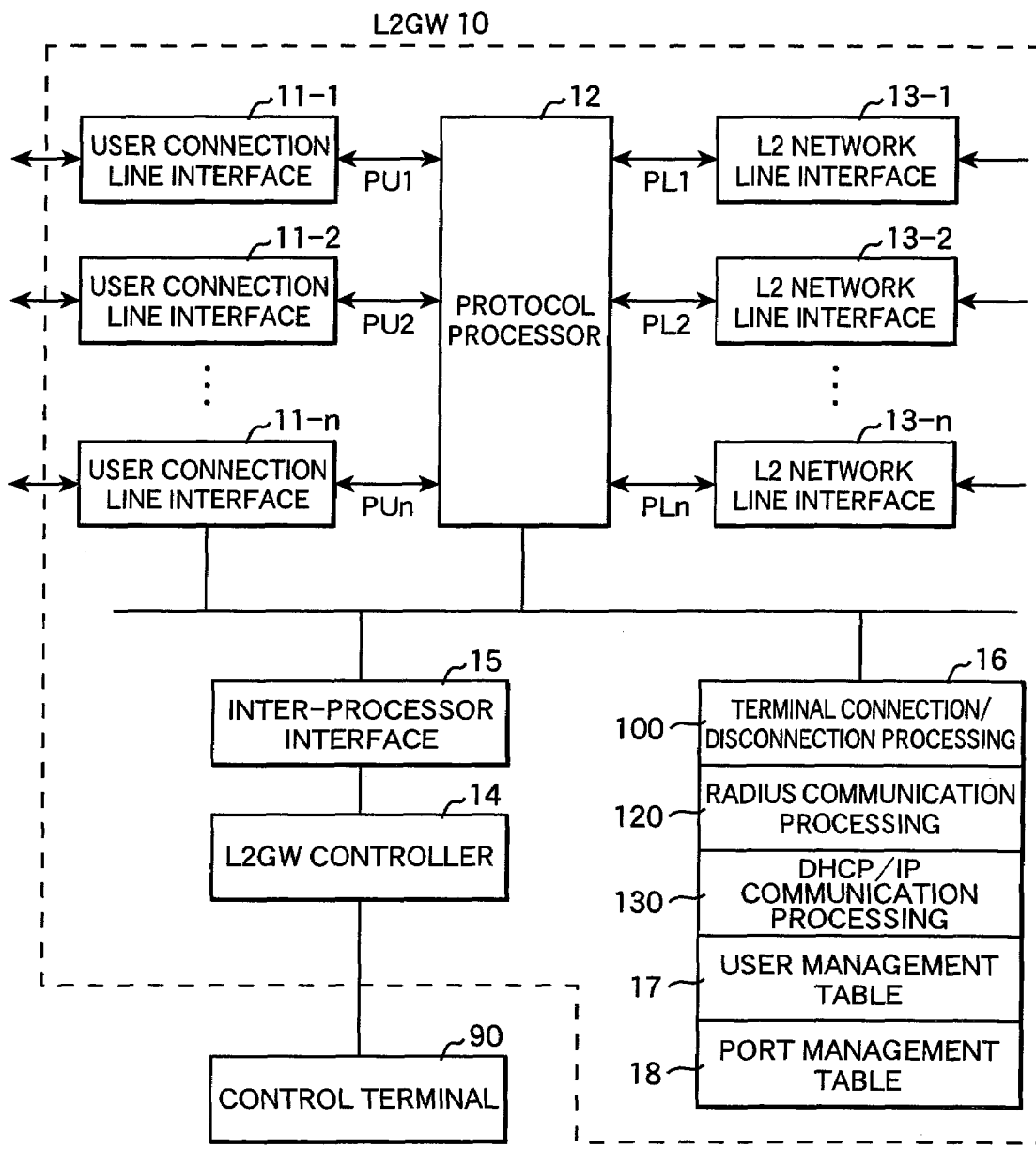
FIG. 6 is a block diagram showing a configuration of a packet forwarding apparatus (L2GW) according to the present invention.

FIG. 6 is a block structural diagram of the packet forwarding apparatus (L2GW) 10. The L2GW 10 comprises a plurality of user connection line interfaces 11-1 to 11-$n$, a plurality of transit network (L2 network) line interfaces 13-1 to 13-$n$, a protocol processor 12, an L2GW controller 14, an inter-processor interface 15 for connecting the protocol processor 12 and the L2GW controller 14, and a memory 16. PU1 to PU$n$ denote user side port numbers and PL1 to PL$n$ denote L2 network side port numbers.

In the memory 16, a terminal connection/disconnection processing routine 100, a RADIUS communication processing routine 120, and a DHCP/IP communication processing routine 130 are prepared as software to be used by the protocol processor 12. A user management table 17 and a port management table 18 are also formed in the memory 16.

As illustrated in FIGS. 7A and 7B, a plurality of table entries are registered in the user management table 17. Each table entry includes packet forwarding control information for each user terminal, in association with the user side port numbers 171. The packet forwarding control information indicates the relation among a terminal MAC address 172, a session ID 173, and an authentication result 174.

As illustrated in FIGS. 8A and 8B, the port management table 18 stores, in association with each of the L2 network side port numbers 181, MAC addresses 182 of source apparatuses of received frames. Usage of the user management table 17 and the port management table 18 will be detailed later.

The protocol processor 12 communicates communication frames with the user connection line interfaces 11-1 to 11-$n$ and the L2 network line interfaces 13-1 to 13-$n$ and carries out communication control procedures for the PPPoE connection/disconnection phases, LCP connection/disconnection phases, and authentication phase, with each user terminal according to the terminal connection/disconnection processing routine 100. The protocol processor 12 also carries out a user authentication procedure with the RADIUS server 30 according to the communication processing routine 120, and a DHCP phase communication procedure with the DHCP server 40 according to the communication processing routine 130.

In the PPPoE connection phase, the protocol processor 12 stores the MAC address 172 of the connection requesting terminal into the user management table, as illustrated in FIG. 7A. In the authentication phase, the protocol processor 12 stores an authentication result 174 into the user management table 17, as illustrated in FIG. 7B.

In the DHCP phase and the IP forwarding phase that are carried out according to the DHCP/IP communication processing routine 130, the protocol processor 12 refers to the user management table 17 and discards a received frame if the frame includes, as its destination address or source address, a MAC address not registered in the user management table 17 or a MAC address for which a normal authentication result is not registered in the user management table 17. Packet forwarding control information registered in the user management table 17 is erased in the PPPoE disconnection phase. The L2GW controller 14 supervises the status of the protocol processor 12 and notifies the control terminal 90 of an abnormality in the protocol processor, if occurs.

Figure 9:
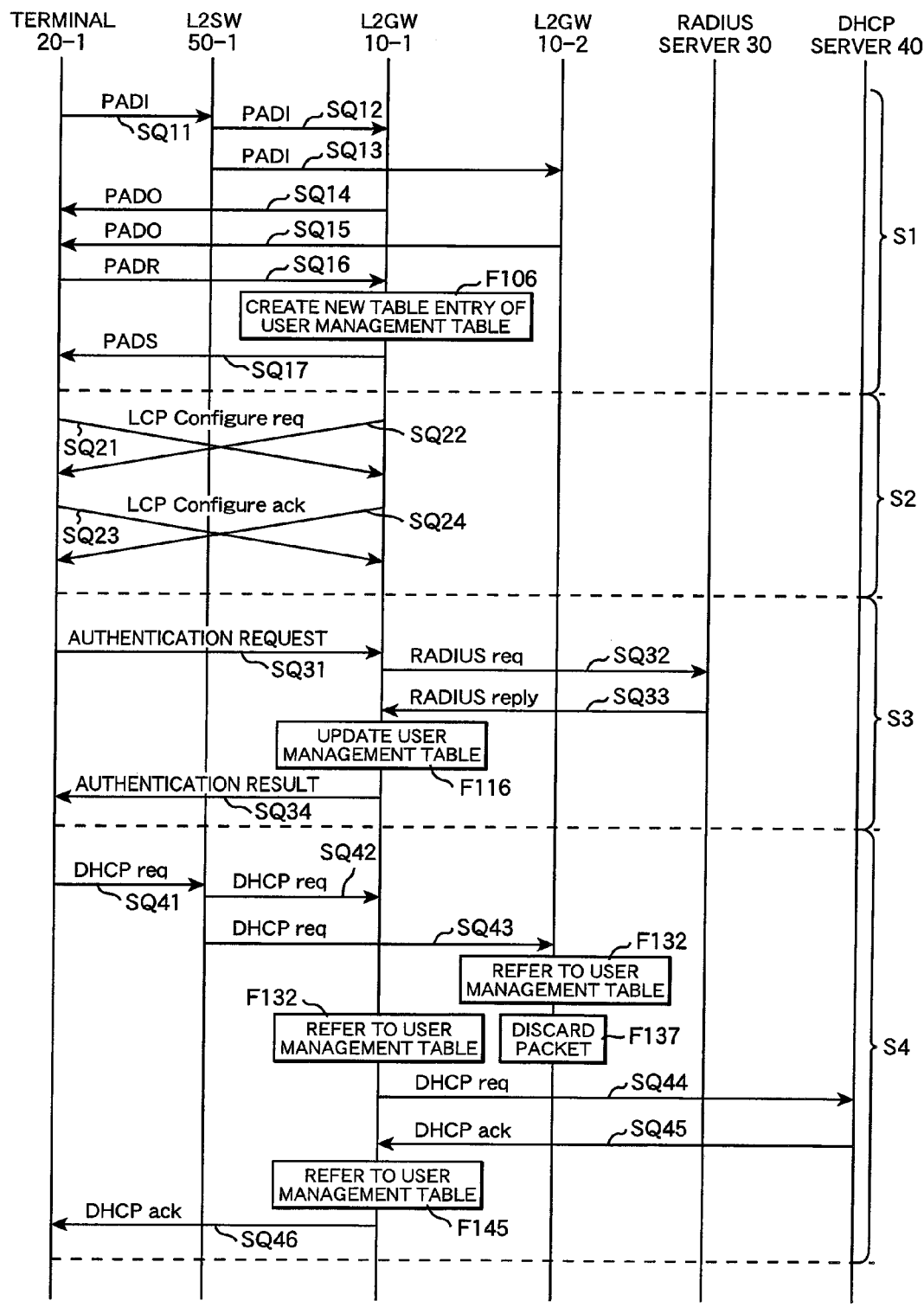
FIG. 9 illustrates a communication sequence for a PPPoE connection phase S1, LCP connection phase S2, authentication phase S3, and DHCP phase in the present invention.
Figure 10:
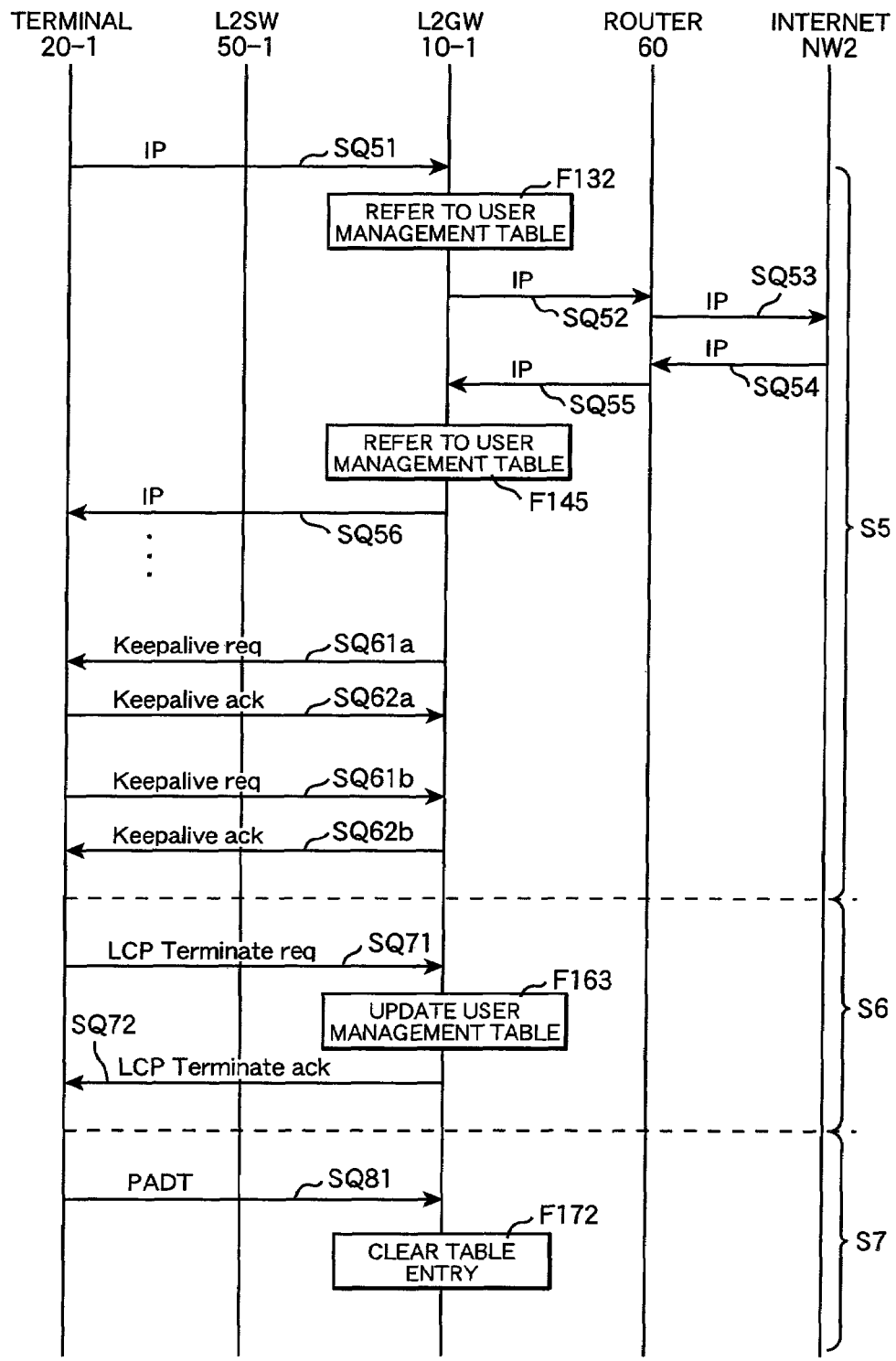
FIG. 10 illustrates a communication sequence for an IP forwarding phase S5, LCP disconnection phase S6, and PPPoE disconnection phase S7 in the present invention.

FIG. 9 illustrates a communication sequence for the PPPoE connection phase S1, LCP connection phase S2, authentication phase S3, and DHCP phase S4 to be carried out in the network shown in FIG. 1, when a user terminal 20-1 accommodated in the L2SW 50-1 accesses the Internet NW2. FIG. 10 illustrates a communication sequence for the IP forwarding phase S5, LCP disconnection phase S6, and PPPoE disconnection phase S7. In the following, description will be made about the operations of the user terminal 20 and the packet forwarding apparatus L2GW 10 according to the present invention, by referring to the communication sequences illustrated in FIGS. 9 and 10 and flowcharts provided in FIGS. 11 through 19.

First, a procedure in the PPPoE connection phase S1 will be described.

Figure 11:
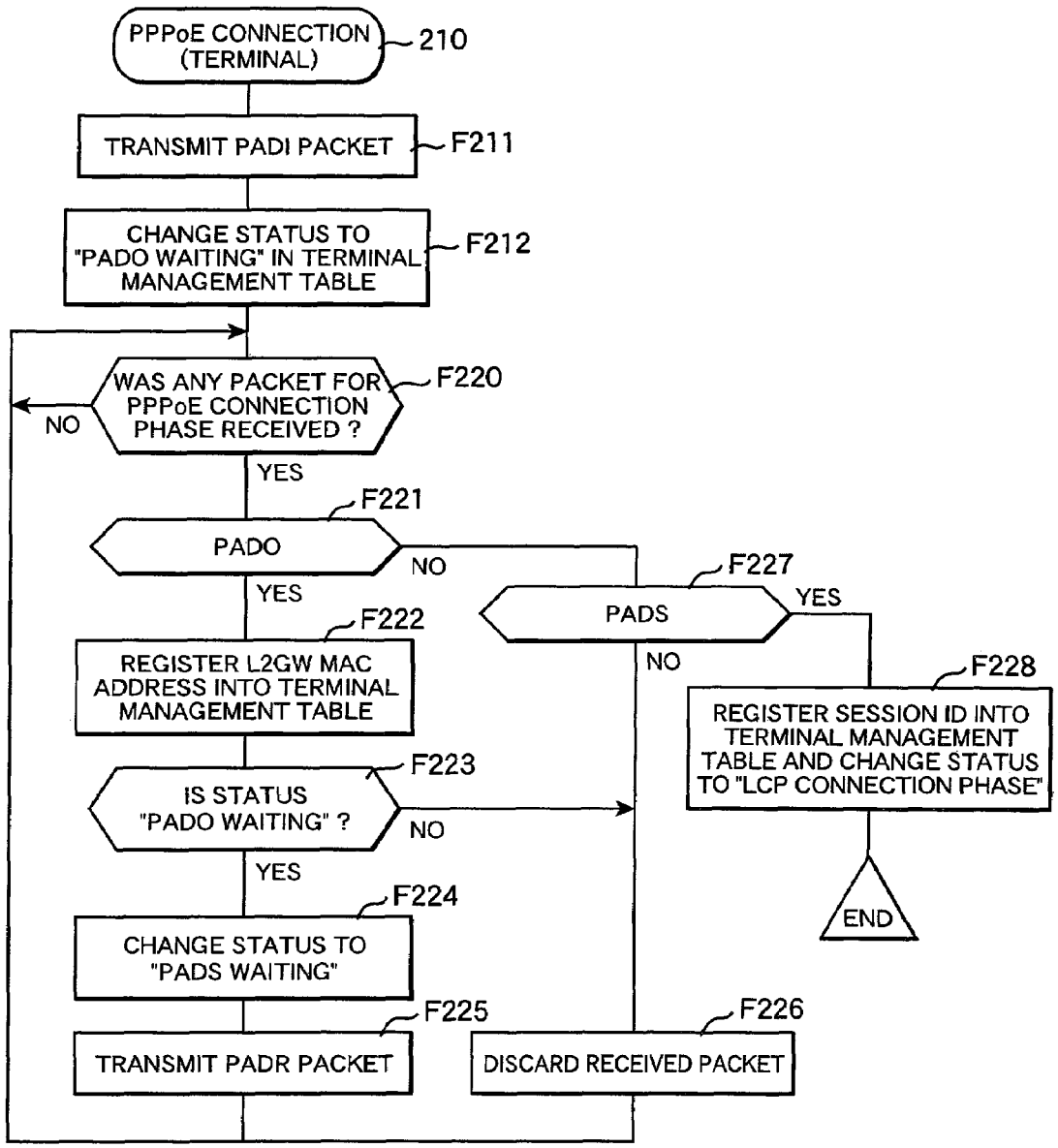
FIG. 11 is a flowchart illustrating an example of a PPPoE connection routine 210 to be executed by the user terminal.

FIG. 11 illustrates a flowchart of a PPPoE connection routine 210 to be executed by the user terminal 20-1. The routine 210 forms a part of the communication processing routine 200 mentioned in FIG. 4, together with an LCP/DHCP connection routine 230 which will be described in FIG. 13 and a LCP/PPPoE disconnection routine 250 which will be described in FIG. 17.

Figure 12:
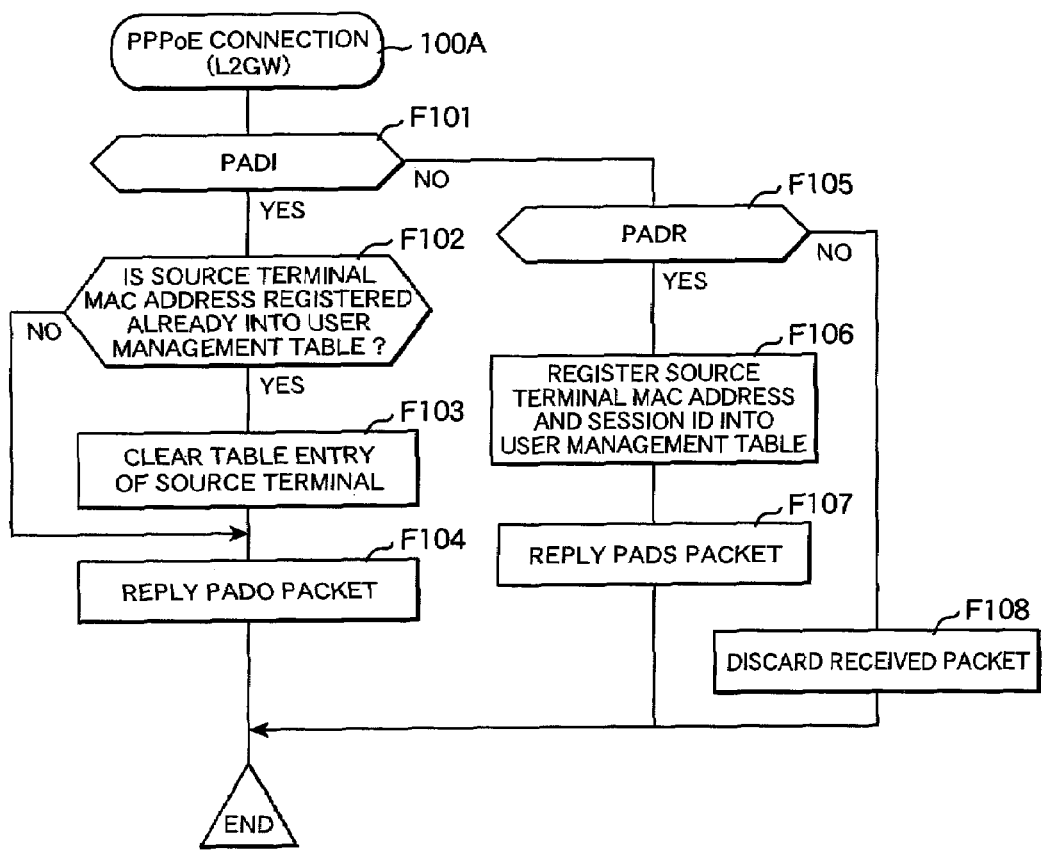
FIG. 12 is a flowchart illustrating an example of a PPPoE connection routine 100A to be executed by the L2GW.

FIG. 12 illustrates a flowchart of a PPPoE connection routine 100A to be executed by the L2GW 10 (10-1, 10-2) when receiving a packet in the PPPoE connection phase. The routine 100A forms a part of the terminal connection/disconnection routine 100 mentioned in FIG. 6, together with an LCP connection/authentication routine 110A which will be described in FIG. 14, an LCP disconnection routine 110B which will be described in FIG. 18, and a PPPoE disconnection routine 100B which will be described in FIG. 19.

In the case where the user terminal 20-1 establishes a session with the transit network NW1, the terminal first transmits to an access line a PPPoE frame including a PPPoE Active Discovery Initiation (PADI) packet which is a PPPoE phase starting packet, according to the PPPoE connection routine 210 (F211). The user terminal changes the status 255 in the terminal management table 25 to PADO waiting state (F212), as indicated by an entry EN(1) in FIG. 5, and waits for arrival of a packet of PPPoE phase (F220).

The PADI packet is issued to look for a packet forwarding node (L2GW) that is adaptable to a communication service desired by the user terminal 20-1. A broadcast address is set as the destination MAC address 711 of the Ethernet header. As illustrated in FIG. 9, the PADI packet is received by the L2SW 50-1 (SQ11) and broadcasted to the L2GW 10-1 and L2GW 10-2 by the L2SW 50-1 (SQ12, SQ13).

Upon receiving a control packet (PPPoE frame) of PPPoE connection phase S1, each of the L2GW 10-1 and L2GW 10-2 judges the type of the received packet (F101) according to the PPPoE connection routine 100A illustrated in FIG. 12. When the PADI packet is received as in this example, each of the L2GW 10-1 and L2GW 10-2 checks whether the source MAC address of the received frame has been registered as a terminal MAC address 172 in the user management table 17 (F102).

If the source MAC address is not registered in the user management table 17, each of the L2GW 10-1 and L2GW 10-2 sends back a PPPoE frame including a PPPoE Active Discovery Offer (PADO) packet to the source terminal (F104). If the source MAC address has been registered in the user management table 17, each of the L2GW 10-1 and L2GW 10-2 clears the table entry having the source MAC address (F103) and sends back the PADO packet (F104). Thus, the PADO packets are transmitted to the terminal 20-1 from both the L2GW 10-1 and L2GW 10-2 (SQ14, SQ15).

Upon receiving the PPPoE frame including the PADO packet (F220), the terminal 20-1 judges the type of received packet (F221). As in this example, when receiving the PADO packet, the terminal 20-1 registers the source MAC address 712 extracted from the Ethernet header into the terminal management table 25 (F222). Then, the entry EN(1) of the terminal management table 25 is changed into the state of an entry EN(2) as shown in FIG. 5.

The user terminal 20-1 checks the status 255 in the terminal management table 25 (F223). If the status 255 is PADO waiting, the user terminal changes the status 255 to PPPoE Active Discovery Session-Configuration (PADS) waiting (F224), as indicated by an entry EN(3) in FIG. 5. Then, the terminal transmits a PPPoE frame including a PPPoE Active Discovery Request (PADR) packet which is a PPP session start request packet to the source of the PADO packet (F225) and waits for arrival of a next packet in the PPPoE connection phase (F220). If a PADO packet is received when the status 255 is not PADO waiting in the terminal management table 25, the PADO packet is discarded (F226).

Because the user terminal 20-1 receives the PADO packets from both the L2GW 10-1 and L2GW 10-2 in this example, the terminal selects one of the PADO packets received and transmits the PPPoE frame including the PADR packet to the source of the selected PADO packet. In FIG. 9, the user terminal 20-1 transmits the PADR packet addressed to the L2GW 10-1 (SQ16) which is the source of the first received PADO packet (SQ14).

Upon receiving the PPPoE frame including the PADR packet, the L2GW 10-1 judges the type of the received packet (F101) according to the flowchart of FIG. 12. Because the L2GW 10-1 receives the PADR packet (F105) this time, the L2GW 10-1 assigns a session ID to a new PPP session requested by the PADR and adds a new table entry to the user management table 17 (F106). The table entry includes the source MAC address of the received PADR packet as a terminal MAC address 172 and the assigned session ID as a session ID 173.

In this case, as the PADR packet was received through a user connection line interface 11-1 having a port number PU1, the L2GW 10-1 registers the new table entry into the user management table in association with the user side port number PU1, as illustrated in FIG. 7A. Then, the L2GW 10-1 generates a PADS packet in which the session ID 173 is specified and transmits a PPPoE frame including the PADS packet to the user terminal which is the source of the PADR packet (F107).

If the L2GW 10-1 in the PADR packet waiting state receives a PPPoE connection phase packet other than the PADR packet, the received packet is discarded (F108). The L2GW 10-1 exits the PPPoE connection phase S1 by transmitting the above PADS packet (SQ17).

On the other hand, upon receiving the PPPoE frame including the PADS packet, the user terminal 20-1 judges the type of the received packet (F221, F227) according to the PPPoE connection routine 210. Because the received packet is a PADS this time, the user terminal 20-1 registers into the terminal management table 25, as shown by an entry EN(4) in FIG. 5, the session ID specified in the PADS packet as the session ID 252 and changes the status 255 to LCP connection phase (F228). After that, the user terminal 20-1 exits the PPPoE connection phase S1.

If a PPPoE connection phase packet other than the PADS packet is received when the status 255 is PADS waiting in the terminal management table 25, the user terminal 20-1 discards the received packet (F226) and waits for arrival of a next PPPoE connection phase packet (F220).

Next, procedures in the LCP connection phase S2, authentication phase S3, and DHCP phase S4 will be described by referring to FIG. 9 and FIGS. 13 through 16. In the LCP connection phase S2 and the authentication phase S3, a PPPoE frame having the format in which the Ethernet header 71 is attached to a packet comprising the variable length payload 76, PPPoE header 72, and PPP header 73, as illustrated in FIG. 2(B) is used.

Figure 13:
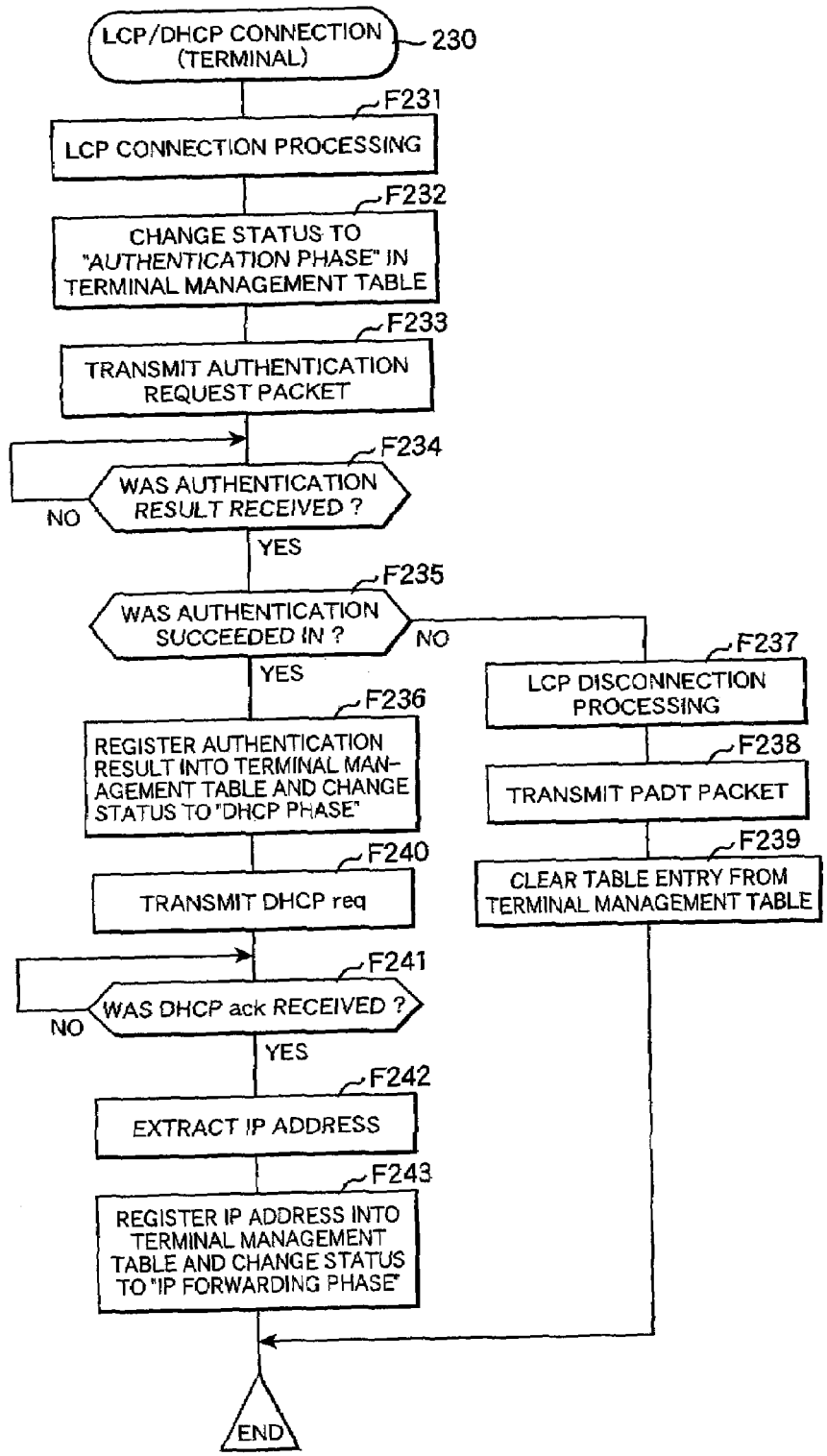
FIG. 13 is a flowchart illustrating an example of an LCP/DHCP connection routine 230 to be executed by the user terminal.

The user terminal 20-1 having established a PPPoE session performs LCP connection processing (F231) according to the LCP/DHCP connection routine 230 illustrated in FIG. 13. Similarly, the L2GW 10-1 performs LCP connection processing (F111) according to the LCP connection/authentication routine 110A illustrated in FIG. 14.

In the LCP connection processing (F231), the user terminal 20-1 transmits a link setup request packet (LCP Configure request) to the L2GW 10-1 with which the PPPoE session has been established (SQ21). Similarly, the L2GW 10-1 also transmits a link setup request packet (LCP Configure request) to the user terminal 20-1 with which the PPPoE session has been established (SQ22), in the LCP connection processing (F111).

Upon receiving the LCP Configure request from the L2GW 10-1, the user terminal 20-1 sends back a reply packet (LCP Configuration acknowledge) to the L2GW 10-1 (SQ23), if the terminal can assent to all communication configuration options specified in this LCP Configure request. Similarly, upon receiving the LCP Configure request from the user terminal 20-1, the L2GW 10-1 sends back a reply packet (LCP Configuration acknowledge) (SQ24), if the L2GW can assent to all communication configuration options specified in the received LCP Configure request. In this way, by sending back the LCP Configuration acknowledges from both the L2GW 10-1 and the user terminal 20-1 connected by the PPPoE session, the LCP connection processing is completed.

When the LCP connection processing (F231) is completed, the user terminal 20-1 changes the status 255 in the terminal management table 25 into authentication phase, as indicated by an entry EN(5) in FIG. 5, transmits an authentication request packet including a terminal MAC address (or user ID) and a password (F233, SQ31 in FIG. 9) and waits for arrival of a notification of authentication result (F234).

Figure 14:
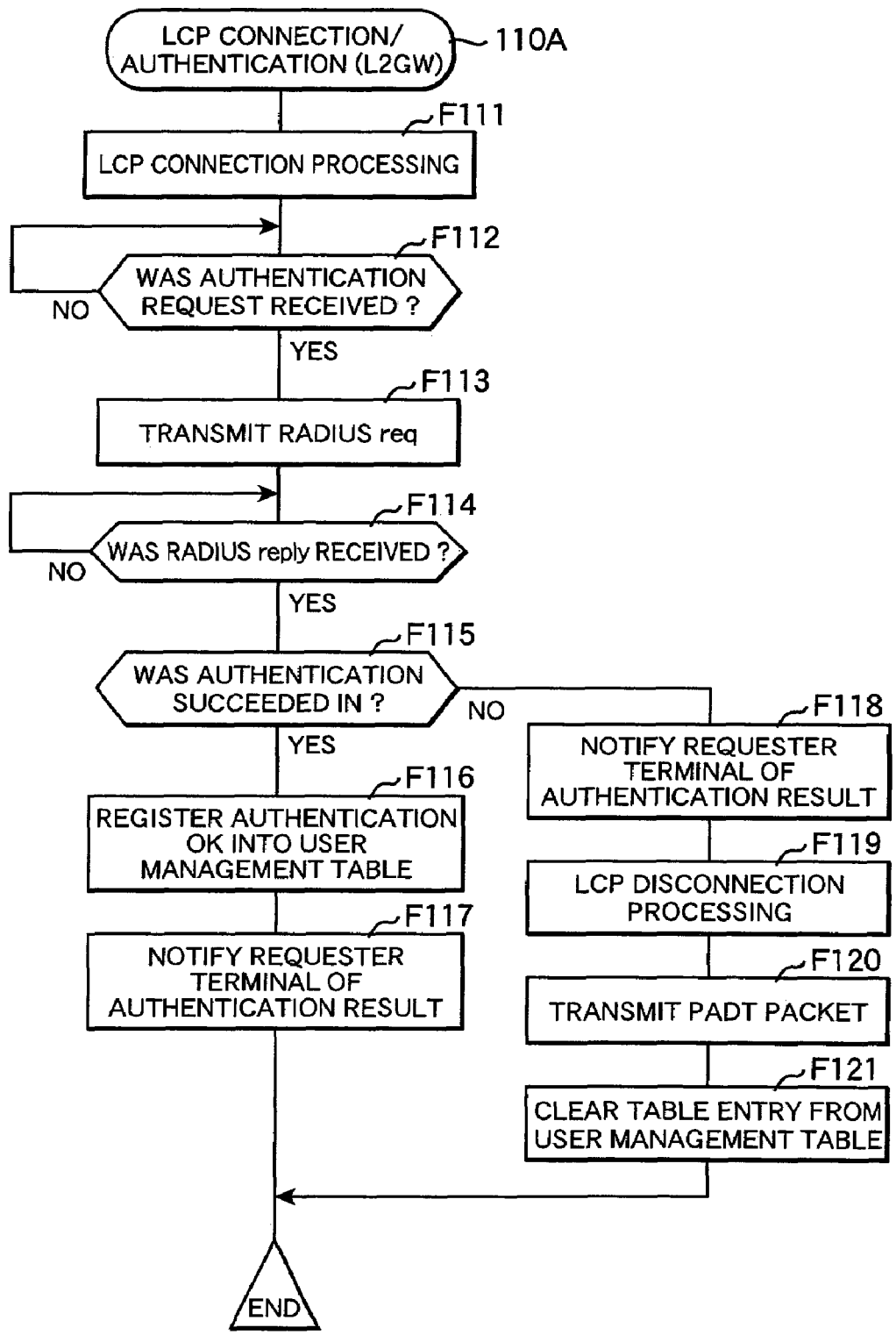
FIG. 14 is a flowchart illustrating an example of an LCP connection/authentication routine 110A to be executed by the L2GW.

The L2GW 10-1 waits for arrival of an authentication request packet from the user terminal (F112) after completing the LCP connection processing (F111), as illustrated in the flowchart of FIG. 14. Upon receiving the authentication request packet from the user terminal 20-1, the L2GW 10-1 transmits a RADIUS request packet for user authentication to the RADIUS server 30 (F113) according to the RADIUS communication processing routine 120, and waits for a reply from the RADIUS server 30 (F114).

The RADIUS request packet is forwarded to the RADIUS server 30 via an L2SW 51-1 (SQ32). The RADIUS server 30 checks the correspondence of the terminal MAC address (user ID) and password specified in the above RADIUS request packet based on the user information registered beforehand and sends back a response packet (RADIUS reply) indicating an authentication result to the L2GW 10-1 (SQ33).

Upon receiving the RADIUS reply (F114), the L2GW 10-1 judges the authentication result (F115). If the user authentication was successful, the L2GW 10-1 registers authentication OK as the authentication result 174 in the user management table 17 (F116), as illustrated in FIG. 7B, transmits an authentication result notification packet to the user terminal 20-1 (F117, SQ34 in FIG. 9), and exits the LCP connection routine 110A. The authentication OK may be represented by a flag bit "1".

If the user authentication was unsuccessful, the L2GW 10-1 transmits an authentication reject notification packet to the user terminal 20-1 (F118) and performs LCP disconnection processing (F119). After that, the L2GW 10-1 transmits to the user terminal 20-1 a PPPoE Active Discovery Terminate (PADT) packet which is a session termination packet (F120), clears the table entry for the user terminal 20-1 from the user management table 17 (F121), and exits the LCP connection routine 110A.

Upon receiving the authentication result notification packet (F234), the user terminal 20-1 judges the authentication result (F235). If the authentication was successful, the user terminal 20-1 registers authentication OK as the authentication result 253 in the terminal management table 25 and changes the status 255 into DHCP phase (F236) as shown by an entry EN(6). Then, the LCP connection phase S2 and the authentication phase S3 are terminated and the user terminal enters the DHCP phase S4.

If the user authentication was unsuccessful, the user terminal 20-1 performs LCP disconnection processing (F237). After transmitting a PADT packet to the L2GW 10-1 (F238), the user terminal clears the table entry from terminal management table 25 (F239) and exits the LCP/DHCP connection routine 230.

According to the prior art, following the completion of the authentication phase S3, the user terminal performs an NCP phase communication procedure such as IPCP negotiation with the L2GW 10-1 so that IP packets that are subsequently transmitted from the user terminal are forwarded across the transit network NW1 according to the PPPoE protocol.

In the present embodiment, as illustrated in the flowchart of FIG. 13, the user terminal 20-1 having been succeeded in authentication broadcasts, without performing the NCP phase communication procedure, a DHCP request packet for requesting IP address assignment to the DHCP server 40 (F240) and waits for arrival of a DHCP acknowledge reply packet (F241). The above DHCP request packet is transmitted in the form of Ethernet frame illustrated in FIG. 3B.

The DHCP request packet transmitted from the user terminal 20-1 (SQ41) is broadcasted to the L2GWs 10-1 and 10-2 by the L2SW 50-1 (SQ42, SQ43). Upon receiving an Ethernet frame from the user terminal line interface 11 side, each of the L2GWs 10-1 and 10-2 executes a DHCP/IP communication processing routine 130A illustrated in FIG. 15. If an Ethernet frame is received from the L2 network line interface 13 side, each of the L2GWs 10-1 and 10-2 executes a DHCP/IP communication processing routine 130B illustrated in FIG. 16.

Upon receiving the Ethernet frame including the DHCP packet transmitted from the user terminal 20-1, each of the L2GWs 10-1 and 10-2 extracts the source MAC address (F131) from the received frame according to the routine 130A and checks, by referring to the user management table 17, whether a table entry having the above source MAC address has been registered and the relevant authentication result 253 indicates authentication OK (F132).

If no table entry having that source MAC address is registered, or if the relevant authentication result 253 is not authentication OK, the received packet is discarded (F137). As having been described, in the case where the user terminal 20-1 has transmitted the authentication request only to the L2GW 10-1 (SQ31) and the L2GW 10-2 did not receive the authentication request, the authentication result 253 indicates authentication OK only in the user management table 17 on the L2GW 10-1 (F116). Therefore, the L2GW 10-2 that has not received the authentication request from the user terminal 20-1 discards the DHCP request packet (F137), as illustrated by the sequence of FIG. 9.

After determining that the source MAC address and authentication OK has been registered in the user management table 17, the L2GW 10-1 extracts the destination MAC address from the received fame (F133) and checks whether the destination MAC address has been registered in association with any L2 network side port number 181 in the port management table 18 (F134).

If the destination MAC address has been registered in the port management table 18, the L2GW 10-1 forwards the Ethernet frame including the above DHCP request packet to an L2 network line interface 13-*j* having the L2 side port number 181 which corresponds to the destination MAC address in the port management table 18 (F135, SQ44 in FIG. 9). If the above destination MAC address is not registered in the port management table 18, the L2GW 10-1 forwards the DHCP packet (Ethernet frame) to all L2 network line interfaces 13-1 to 13-*n* (F136).

Upon receiving the DHCP request packet, the DHCP server 40 assigns an IP address to the user terminal 20-1 and sends back to the L2GW 10-1 a response frame including a DHCP acknowledge packet in which the IP address is specified (SQ45).

Figure 16:
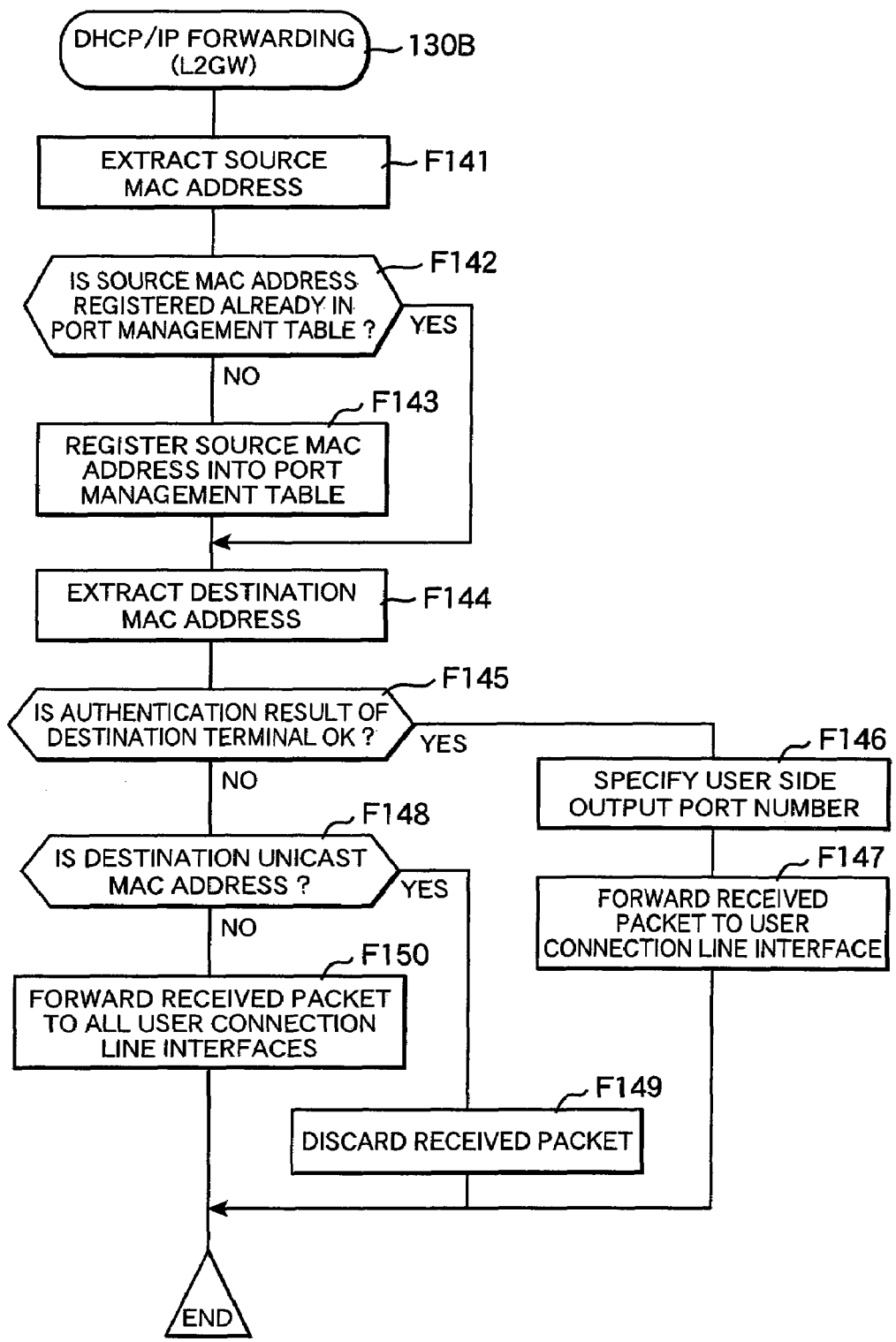
FIG. 16 is a flowchart illustrating an example of a DHCP/IP forwarding routine 130B to be executed by the L2GW when receiving an Ethernet frame from transit network side.

Upon receiving the above response frame through the L2 network interface, the L2GW 10-1 extracts the source MAC address (DHCP server MAC address) from the received frame (F141) and checks whether the source MAC address has been registered in the port management table 18 (F142) according to the DHCP/IP communication processing routine 130B illustrated in FIG. 16.

If that MAC address is not registered, the L2GW 10-1 registers the source MAC address (DHCP server MAC address) in association with the port number of the L2 network interface, through which the response frame was received, into the port management table 18 (F143). As a result, assuming that the response frame was received, for example, through the L2 network interface of port number PLn, the MAC address "00-00-87-00-00-17" of the DHCP server 40 is registered in association with the port number PLn into the port management table 18, as illustrated in FIG. 8A.

The L2GW 10-1 then extracts the destination MAC address from the received frame (F144) and checks, by referring to the user management table 17, whether a table entry having the destination MAC address has been registered and the relevant authentication result 253 indicates authentication OK (F145). If authentication OK is indicted in the table entry having that MAC address, the L2GW 10-1 specifies the user side port number 171 from the above table entry (F146) and forwards the received frame to the user connection line interface having the user side port number (F147, SQ46 in FIG. 9).

If no table entry having that destination MAC address is registered in the user management table 17, the L2GW 10-1 judges whether the destination MAC address of the received frame is a unicast address or multicast (or broadcast) address (F148). If the destination MAC address is a unicast address, the L2GW 10-1 discards the received frame (F149). Otherwise, the L2GW 10-1 forwards the received frame to all user connection line interfaces (FI50).

Upon receiving the response frame including the DHCP acknowledge packet (F241), the user terminal 20-1 extracts the IP address from the DHCP acknowledge packet (F242), registers the IP address 254 into the terminal management table 25 and changes the status 255 to IP forwarding phase (F243), as indicated by an entry EN(7) in FIG. 5. After that, the user terminal 20-1 transits from the DHCP phase S4 to the IP forwarding phase S5.

Next, a communication sequence in the IP forwarding phase S5 will be described with reference to FIG. 10. In the IP forwarding phase S5, the user terminal 20-1 transmits an IP packet in the form of Ethernet frame illustrated in FIG. 3B (SQ51).

Figure 15:
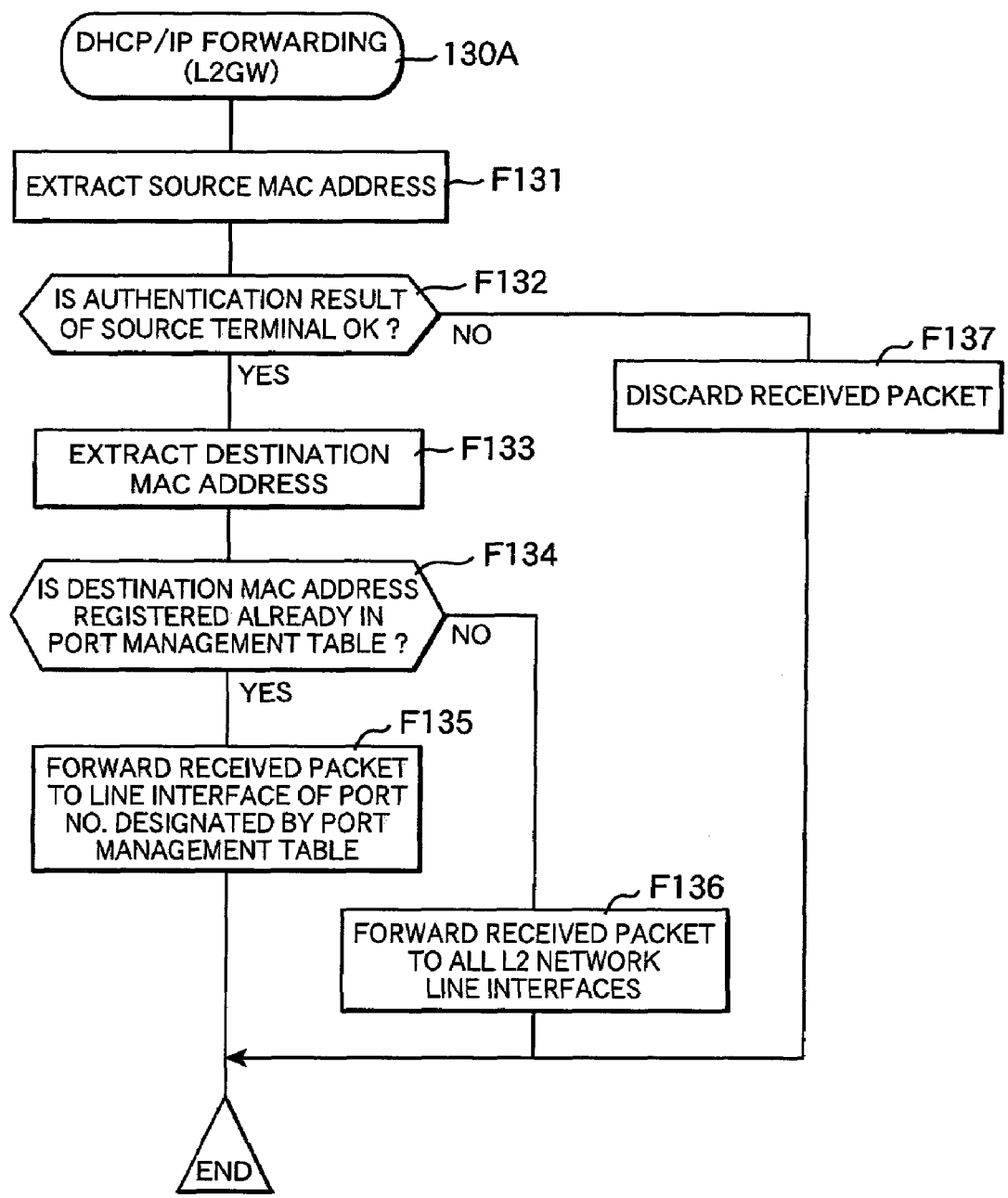
FIG. 15 is a flowchart illustrating an example of a DHCP/IP forwarding routine 130A to be executed by the L2GW when receiving an Ethernet frame from the access network side.

Upon receiving the Ethernet frame including the IP packet, the L2GW 10-1 extracts the source MAC address from the received frame (F131) and checks the terminal MAC address and the relevant authentication result (F132) by referring to the user management table 17, according to the DHCP/IP communication processing routine 130A illustrated in FIG. 15.

Since the source MAC address of the user terminal 20-1 has already been registered in the user management table 17 and the relevant authentication result 174 is authentication OK in the present embodiment, the L2GW 10-1 extracts the destination MAC address from the received frame (F133), specifies the L2 network side port number corresponding to the destination MAC address from the port management table 18 (F134), and forwards the received frame to the L2 network line interface 13 identified with the above L2 network side port number (F135).

If that destination MAC address is not registered in the port management table 18, the L2GW 10-1 forwards the received frame to all L2 network line interfaces (F136). In consequence, a transmission frame (IP packet) from the user terminal 20-1 is forwarded to the router 60 (SQ52) and forwarded from the router 60 to the destination device, e.g., a Web server on the Internet NW2 (SQ53). Reversely, an IP packet destined to the user terminal 20-1, received by the router 60 from the Internet NW2 side (SQ54), is forwarded in the form of Ethernet frame to the L2GW 10-1 (SQ55).

Upon receiving the Ethernet frame from the router 60, the L2GW 10-1 extracts the source MAC address (the MAC address of the router 60) from the received frame (F141) and checks whether the source MAC address has been registered in the port management table 18 (F142), according to the DHCP/IP communication processing routine 130B illustrated in FIG. 16. If that source MAC address has not been registered, the L2GW 10-1 registers the source MAC address (the MAC address of the router), in association with the port number of the L2 network interface through which the Ethernet frame was received, into the port management table 18 (F143). As a result, assuming that the Ethernet frame was received through the L2 network interface having the port number PLn, the MAC address "00-00-87-00-00-18" of the router 60 is registered into the port management table 18, as illustrated in FIG. 8A.

The L2GW 10-1 then extracts the destination MAC address from the received frame (F144) and checks, by referring to the user management table 17, whether a table entry having the destination MAC address has been registered and the relevant authentication result 253 is authentication OK (F145). If the received frame is addressed to the user terminal 20-1, the table entry having that destination MAC address has already been registered in the user management table 17 and the relevant authentication result 253 is authentication OK. Thus, the L2GW 10-1 specifies the user side port number 171 (F146) from the table entry and forwards the received frame to the user connection line interface identified with the user side port number (F147, SQ56 in FIG. 9).

According to the present embodiment, in this way, the L2GW 10-1 selectively controls the forwarding of Ethernet frames received from the user network side and the L2 network side in the IP forwarding phase, by referring to the user management table 17.

In the IP forwarding phase, the L2GW 10-1 and the user terminal 20-1 communicate Keepalive packets periodically in order to monitor the operating status of the other device mutually. For example, when the L2GW 10-1 transmits a Keepalive request packet (SQ61*a*) in the form of Ethernet frame periodically, destined to each terminal MAC address registered in the user management table 17, the user terminal 20-1 having received the Keepalive request packet sends back, as a response packet, a Keepalive acknowledge packet to the L2GW 10-1 (SQ62*a*).

Likewise, when the user terminal 20-1 transmits an Ethernet frame including a Keepalive request packet (SQ61*b*), the L2GW 10-1 sends back, in response to the request packet, a Keepalive acknowledge packet to the user terminal 20-1 (SQ62*b*). When the user terminal stops responding to the Keepalive request packet transmitted from the L2GW 10-1, the L2GW 10-1 disconnects the session with the terminal, judging that the user terminal has discontinued the communication.

Next, procedures in the LCP disconnection phase S6 and the PPPoE disconnection phase S7 will be described by referring to FIG. 10 and FIGS. 17 through 19.

Figure 17:
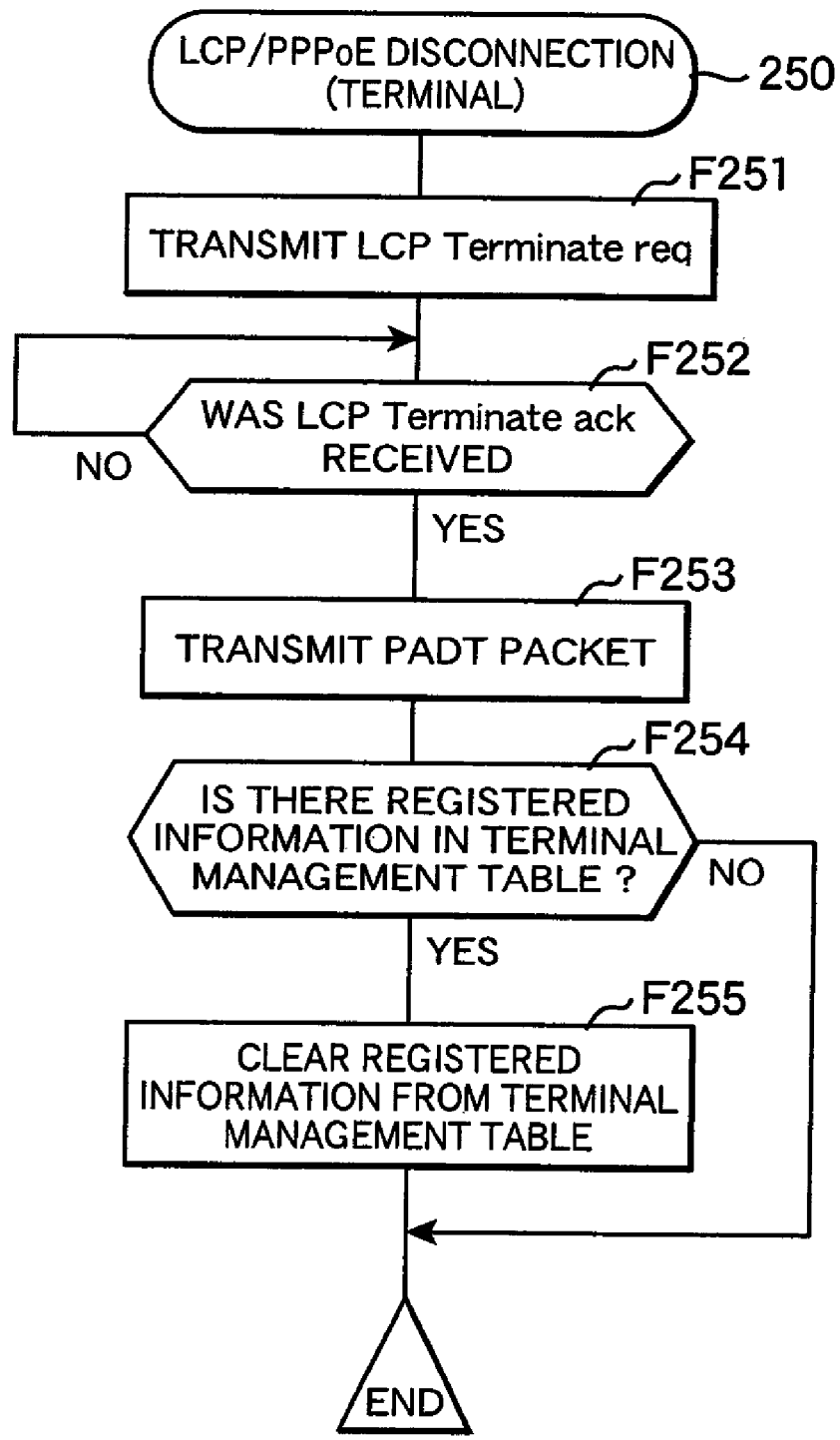
FIG. 17 is a flowchart illustrating an example of an LCP/PPPoE disconnection routine 250 to be executed by the user terminal.
Figure 18:
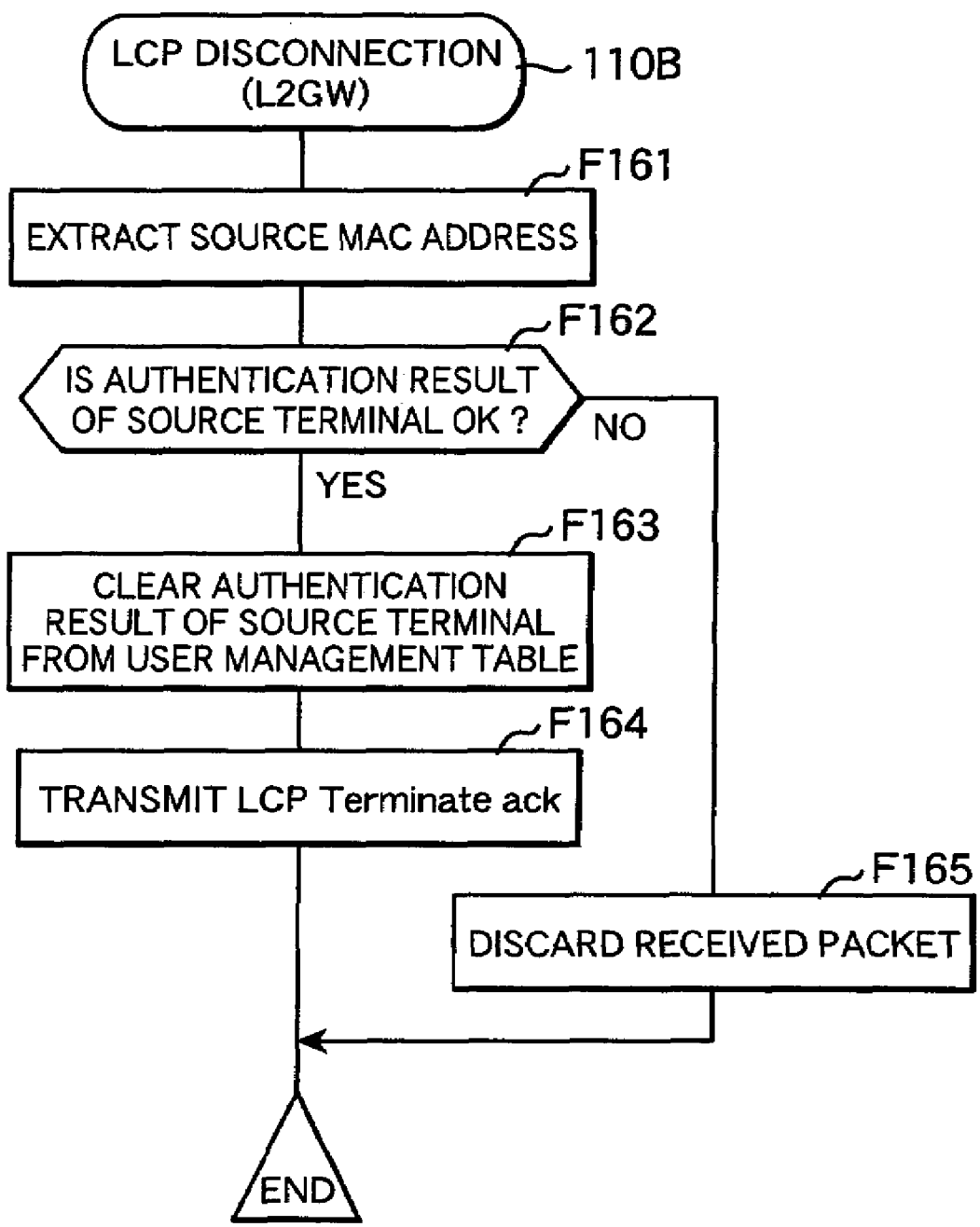
FIG. 18 is a flowchart illustrating an example of an LCP disconnection routine 110B to be executed by the L2GW.
Figure 19:
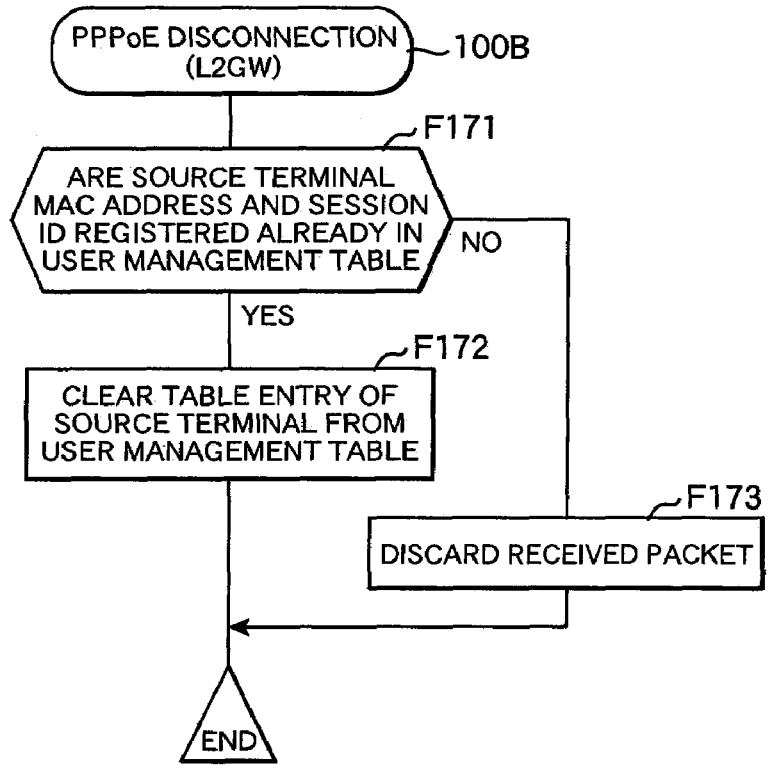
FIG. 19 is a flowchart illustrating an example of a PPPoE disconnection routine 100B to be executed by the L2GW.

FIG. 17 illustrates an LCP/PPPoE disconnection routine 250 to be executed by the user terminal 20-1. FIG. 18 illustrates an LCP disconnection routine 110B to be executed by the L2GW 10-1 when an LCP terminate request packet for requesting a link disconnection was received. FIG. 19 illustrates a PPPoE disconnection routine 100B to be executed by the L2GW 10-1 when a PADT packet for requesting a PPPoE disconnection was received.

In the LCP disconnection phase S6, the user terminal 20-1 and the L2GW 10-1 communicate control packets in the form of PPPoE frame having a PPP header as illustrated in FIG. 2B. When disconnecting the link in response to a user operation to terminate the Internet access, the user terminal 20-1 transmits an LCP Terminate request packet which is a link disconnection request in LCP to the L2GW 10-1 (F251, SQ71 in FIG. 9) and waits for arrival of a response packet (F252), according to the LCP/PPPoE disconnection routine 250 illustrated in FIG. 17.

Upon receiving the LCP terminate request packet from the user terminal 20-1, the L2GW 10-1 extracts the source MAC address (F161) from the received packet and checks whether the source MAC address has been registered and the relevant authentication result is authentication OK (F162) by referring to the user management table 17, according to the LCP disconnection routine 110B illustrated in FIG. 18. If that source MAC address has not been registered or the relevant authentication result is not authentication OK, the L2GW 10-1 discards the received packet (F165).

If that source MAC address has been registered and the relevant authentication result is authentication OK, the L2GW 10-1 clears the authentication result 174 from the user management table 17 (F163) and sends back a reply (LCP Terminate acknowledge packet) in response to the link disconnection request to the user terminal 20-1 (F164, SQ72 in FIG. 9).

By receiving the LCP Terminate acknowledge packet (F252), the user terminal 20-1 completes the link disconnection and enters the PPPoE disconnection phase S7. In the PPPoE disconnection phase S7, the user terminal 20-1 and the L2GW 10-1 communicate control packets in the form of PPPoE frame as illustrated in FIG. 2A.

Having entered the PPPoE disconnection phase S7, the user terminal 20-1 transmits a PADT packet which is a PPPoE disconnection request to the L2GW 10-1 (F253, SQ81 in FIG. 9). After that, the user terminal 20-1 checks the terminal management table 25 (F254) and clears registered information, if any, from the terminal management table (F255), whereby the PPPoE session is disconnected.

On the other hand, upon receiving the PPPoE frame including the PADT packet from the user terminal, the L2GW 10-1 checks whether the source MAC address (terminal MAC address) of the received frame and the session ID have been registered in the user management table 17 (F171), according to the PPPoE disconnection routine 100B illustrated in FIG. 19.

If those items have been registered, the L2GW 10-1 clears the table entry having the above source MAC address from the user management table 17 (F172). Otherwise, the L2GW 10-1 discards the received packet (F173). Clearing the table entry for the use terminal 20-1 from the user management table 17 means disconnection of the PPPoE link between the L2GW 10-1 and the user terminal 20-1.

The user terminal 20-1 acquires its IP address (IPv4) from the DHCP server 40 in the above-described embodiment. However, if IPv6 is applied as an IP protocol, for example, each user terminal may get an IPv6 address from a DHCPv6 server, using a Router Advertisement (RA) protocol or a DHCPv6 protocol.

Next, the advantage of a redundant L2GW configuration in which each user terminal is connectable to a plurality of L2GWs (10-1 and 10-2) via an L2SW will be described by referring to FIGS. 20 and 21.

Figure 20:
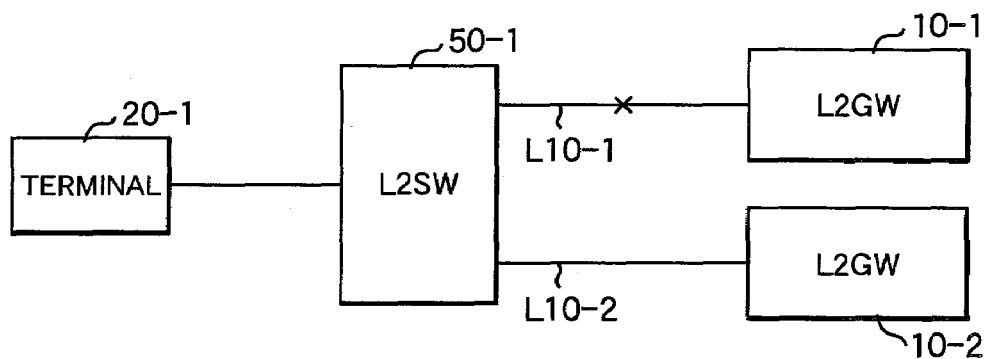
FIG. 20 shows an example of a network configuration including redundant L2GWs.
Figure 21:
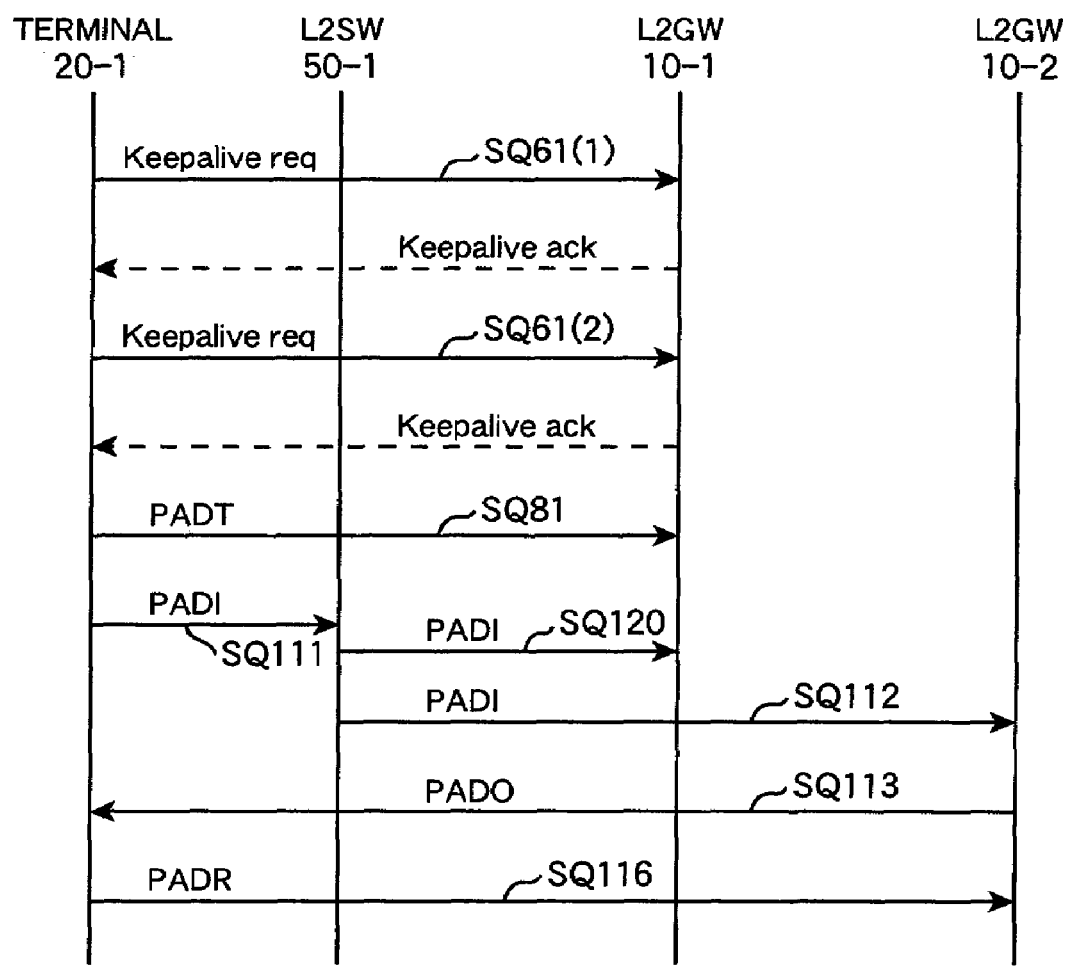
FIG. 21 is a sequence diagram illustrating L2GW switching.

FIG. 20 illustrates a network portion including a terminal 20-1, an L2SW 50-1, and L2GWs 10-1 and 10-2. A communication sequence of FIG. 21 illustrates how the user terminal 20-1 operates when a connection line L10-1 between the L2SW 50-1 and the L2GW 10-1 has failed, as marked with x in FIG. 20. The communication sequence indicated here is also applicable for a case where the connection line L10-1 is normal, but the L2GW 10-1 has malfunctioned.

When a fault occurs in the connection line L10-1 or the L2GW 10-1, the user terminal 20-1 cannot receive a Keepalive acknowledge packet from the L2GW 10-1 within a predetermined time after the user terminal 20-1 transmits a Keepalive request packet to the L2GW 10-1 (SQ61(1)). If there is no response from the L2GW 10-1, the user terminal 20-1 retransmits a Keepalive request packet (SQ61(2)).

When finding that a response packet from the L2GW 10-1 cannot be received in spite of retransmission of the Keepalive request packet, the user terminal 20-1 transmits a PADT packet which is a PPPoE disconnection request to the L2GW 10-1 (SQ81) and once clears the terminal management table. After that, the user terminal 20-1 broadcasts a PADI packet which is a PPPoE start packet in order to look for a new L2GW to be connected instead of the L2GW 10-1 (SQ111).

The PADI packet is forwarded to the L2GWs 10-1 and 10-2 by the L2SW 50-1 (SQ112, S113). At this time, no PADO packet is returned in response to the PADI packet from the failed L2GW 10-1. Therefore, the user terminal 20-1 can receive a PADO packet from the L2GW 10-2 (SQ113). In this case, the user terminal 20-1 transmits a PADR packet to the L2GW 10-2, the source of the PADO packet (SQ116), according to the PPPoE connection routine 210 as described with FIG. 11.

Excepting that the L2GW 10-2 replaces the L2GW 10-2, subsequent communication sequence is the same as the example of the sequence described with FIG. 9. Thus, according to the network configuration in which a user terminal is connectable to a plurality of L2GWs as shown in this embodiment, each user terminal can access the Internet even when one of L2GWs has failed, by performing communication procedures for the PPPoE phase, LCP phase, authentication phase, and DHCP phase with another L2GW in normal state.

As apparent from the above described embodiment, according to the present invention, since a user terminal having been authenticated in the user authentication phase acquires an IP address through the DHCP phase communication procedure and communicates IP packets in the form of Ethernet frame which does not require a PPPoE header and a PPP header in the IP forwarding phase, the efficiency of data transmission over the access lines and the transit network can be improved. Additionally, user terminals can perform IPv6 communication in the IP forwarding phase by acquiring an IPv6 prefix, using, e.g., a Dynamic Host Configuration Protocol for Internet Protocol Version6 (DHCPv6) or the like.

In the communication network shown in FIG. 1, a plurality of user terminals 20 are accommodated to the L2SWs 50 through individual access lines, respectively. Alternatively, a Passive Optical Network (PON) may be applied as the access network. In the PON, an Optical Line Terminal (OLT) located in a central office and a plurality of Optical Network Units (ONUs) for subscriber connections are connected through an optical network in which an optical fiber connected to the OLT diverges at an optical splitter into a plurality of brunch fibers to be connected to each ONU.

In the case where the PON is used as the access network, for example, OLTs are deployed instead of each L2SW 50 (50-1 or 50-2) and each of user terminals 20 is connected to the OLTs via ONU located at subscriber home and an optical fiber. In this case, the OLTs undertake packet forwarding in each phase performed by the L2SWs 50 as described for FIG. 9. The PON may be applied to a network section between the terminals and the L2SWs 50 which are still used. Alternatively, it is also possible to configure a network in which each of user connection line interfaces of L2GW 10 (10-1 or 10-2) shown in FIG. 1 is provided with OLT functionality so that a plurality of ONUs are directly accommodated to the L2GW 10 via optical fibers.

What is claimed is:

1. A packet forwarding apparatus comprising:
 a plurality of user connection line interfaces each connected to an access line;
 a plurality of transit network line interfaces each connected to a transit line;
 a protocol processor for carrying out communication control procedures with each user terminal connected via one of the user connection line interfaces during a Point to Point Protocol over Ethernet (PPPoE) connection phase, a Link Control Protocol (LCP) connection phase, an authentication phase, and a Dynamic Host Configuration Protocol (DHCP) phase; and
 a user management table indicating packet forwarding control information for each user terminal, the packet forwarding control information including a user terminal MAC address, a session identifier and an authentication result of the user terminal,
 wherein said protocol processor is configured to add to said user management table a new table entry indicating the user terminal MAC address and the session ID during execution of the PPPoE phase communication procedure with each user terminal, and to register an affirmative authentication result into the new table entry and notify the user terminal of the authentication result when the user terminal has succeeded in authentication during the authentication phase, and disconnect an LCP session after notifying the user terminal of the authentication result and delete the new table entry from said user management table if the user terminal has failed in the authentication, and wherein when an Ethernet frame having neither a PPPoE header nor a Point to Point Protocol (PPP) header is received, said protocol processor performs forwarding control of the received frame between one of said user connection line interfaces and one of said transit network line interfaces according to said user management table so as to forward the received Ethernet frame when the user management table includes a specific table entry indicating the affirmative authentication result in association with the user terminal MAC address which is specified by a source MAC address or a unicast destination MAC address of the Ethernet frame and to discard the Ethernet frame when the specific table entry does not exist in the user management table.

2. The packet forwarding apparatus according to claim 1, wherein said protocol processor communicates with the user terminal connected to one of said user connection line interfaces control packets in the form of PPPoE frame having a PPPoE header during the PPPoE connection phase, control packets in the form of PPPoE frame having the PPPoE header and a PPP header during the LCP connection phase; and the authentication phase, and communicates control packets and Internet Protocol (IP) packets in the form of the Ethernet frame having neither the PPPoE header nor the PPP header after completing the authentication phase and during a subsequent IP forwarding phase, respectively.

3. The packet forwarding apparatus according to claim 2, wherein said protocol processor communicates with an authentication server via one of said transit network line interfaces during the authentication phase and carries out registration of the affirmative authentication result into the new table entry of said user management table or deletion of the new table entry, depending on the authentication result notified from the authentication server.

4. The packet forwarding apparatus according to claim 2, wherein said protocol processor forwards an Ethernet frame including a DHCP request received from the user terminal to a DHCP server via one of said transit network line interfaces and notifies the user terminal of an IP address by forwarding an Ethernet frame including a DHCP acknowledge received from the DHCP server to one of said user connection line interfaces during the DHCP phase if said user management table includes a specific table entry indicating the affirmative authentication result in association with the MAC address of the user terminal specified by the destination MAC address of the received Ethernet frame.

5. The packet forwarding apparatus according to claim 1, wherein said protocol processor adds into said user management table each of said new table entries indicating the packet forwarding control information for each user terminal, in association with an identification number of each of said user connection line interfaces to which the user terminal is connected through said access line.

6. The packet forwarding apparatus according to claim 2, wherein said protocol processor discards said Ethernet frame in the case where the unicast destination MAC address or the source MAC address of the Ethernet frame is not registered as said user terminal MAC address in said user management table or the affirmative authentication result is not registered in association with the user terminal MAC address in said user management table, during the DHCP phase and the IP forwarding phase.

7. A packet forwarding system comprising:
a first layer 2 gateway and a second layer 2 gateway each located in a transit network and being connected to a plurality of user terminals via at least one layer 2 switch in an access network;
a first layer 2 switch and second layer 2 switch in the transit network, each of the first and second layer 2 switches being connected to said first and second layer 2 gateways and to a communication node apparatus on the Internet side;
an authentication server connected to said first layer 2 switch; and
a DHCP server connected to said second layer 2 switch;
each of said first and second layer 2 gateways including:
a protocol processor for carrying out communication control procedures with each user terminal during a Point to Point Protocol over Ethernet (PPPoE) connection phase, a Link Control Protocol (LCP) connection phase, and an authentication phase; and
a user management table indicating packet forwarding control information for each user terminal, the packet forwarding control information including a user terminal MAC address, a session identifier and an authentication result of the user terminal,
said protocol processor being configured to add to said user management table a new table entry indicating the relation between the user terminal MAC address and the session ID during execution of the PPPoE phase communication procedure with each user terminal, register an affirmative user terminal authentication result into the new table entry and notify the user terminal of the authentication result when the user terminal has succeeded in authentication during the authentication phase, and disconnect an LCP session after notifying the user terminal of the authentication result and delete the new table entry from said user management table if the user terminal has failed in the authentication, and wherein when an Ethernet frame having neither a PPPoE header nor a Point to Point Protocol (PPP) header is received, said protocol processor performs forwarding control of the received frame between said layer 2 switches in the access network and one of said first and second layer 2 switches in the transit network according to said user management table so as to forward the received Ethernet frame when the user management table includes a specific table entry indicating the affirmative authentication result in association with the user terminal MAC address which is specified by a source MAC address or a unicast destination MAC address of the Ethernet frame and to discard the Ethernet frame when the specific table entry does not exist in the user management table.

8. The packet forwarding system according to claim 7, wherein said protocol processor communicates with each of said user terminals, control packets in the form of PPPoE frame having a PPPoE header during the PPPoE connection phase, control packets in the form of PPPoE frame having the PPPoE header and a PPP header during the LCP connection phase and the authentication phase, and control packets and Internet Protocol (IP) packets in the form of said Ethernet frame having neither the PPPoE header nor the PPP header during a Dynamic Host Configuration Protocol (DHCP) phase to be performed after completing the authentication phase and a subsequent IP forwarding phase, respectively.

9. A method for packet forwarding comprising the steps of:

carrying out a communication control procedure in a Point to Point over Ethernet (PPPoE) connection phase between a user terminal and packet forwarding apparatus to which the user terminal is connected through an access network, using PPPoE frames each having a PPPoE header and notifying the user terminal of a session ID from the packet forwarding apparatus;

carrying out communication control procedures in a Link Control Protocol (ILCP) connection phase and an authentication phase between said user terminal and said packet forwarding apparatus, using PPPoE frames each having the PPPoE header and a PPP header; and communicating packets in a Dynamic Host Configuration Protocol (DHCP) phase and an Internet Protocol (IP) forwarding phase among said user terminal, said packet forwarding apparatus, and one of communication node apparatuses on the Internet side, using Ethernet frames having neither the PPPoE header nor the PPP header; and adding a new table entry indicating the relation between a user terminal MAC address and a session ID to a user management table by said packet forwarding apparatus during execution of the PPPoE phase communication procedure; and registering an affirmative authentication result into said new table entry by said packet forwarding apparatus and notifying said user terminal of the authentication result from the packet forwarding apparatus when the user terminal has succeeded in authentication during the authentication phase; and disconnecting an LCP session after notifying the user terminal of the authentication result and deleting the new table entry from said user management table by said packet forwarding apparatus when the user terminal has failed in the authentication during the authentication phase, wherein said packet forwarding apparatus controls forwarding of said Ethernet frames received during the DHCP phase and the IP forwarding phase, according to said user management table, and wherein said packet forwarding apparatus discards a received Ethernet frame in the case where a unicast destination MAC address or a source MAC address of the received Ethernet frame is not registered as said user terminal MAC address in said user management table or the affirmative authentication result is not registered in association with the user terminal MAC address in said user management table, during the DHCP phase and the IP forwarding phase.

10. The packet forwarding apparatus according to claim 2, further comprising:

a port management table for indicating the relation between a port number assigned to one of said transit network line interfaces and a MAC address, wherein said protocol processor is configured to add to said port management table a new table entry indicating a pair of port number and a source MAC address of an Ethernet frame if the source MAC address is not registered in the port management table yet when the Ethernet frame was received through one of said transit network line interfaces during the DHCP phase and the IP forwarding phase, and wherein said protocol processor forwards each Ethernet frame received through one of said user connection line interfaces to specific one of said transit network line interfaces by specifying its port number from said port management table according to a destination MAC address of the received Ethernet frame.

11. The packet forwarding apparatus according to claim 10, wherein said protocol processor is configured to create said new table entry of said user management table so as to associate with a port number assigned to one of said user connection line interfaces when a PPPoE frame including said user MAC address as its source MAC address was received through the user connection line interface, and wherein said protocol processor forwards each Ethernet frame received through one of said transit network line interfaces to specific one of said user connection line interfaces by specifying its port number from said user management table according to a destination MAC address of the received Ethernet frame.

12. A user terminal connectable to a packet forwarding apparatus in a Layer 2 transit network through an access network to access the Internet via the packet forwarding apparatus, the user terminal comprising:

a line interface connected to said access network;

a protocol processor connected to said line interface;

a main processor connected to said protocol processor; and a memory for storing a management table and programs to be executed by said main processor, said management table indicating routing information items and status information which indicates a current communication phase of the user terminal, said routing information items including a MAC address of said packet forwarding apparatus, a session ID, and an IP address assigned to the user terminal, wherein said main processor starts a communication procedure of a Point to Point over Ethernet (PPPoE) connection phase in response to a specific user operation, and subsequently performs communication procedures of a Link Control Protocol (LCP) connection phase, an authentication phase, a Dynamic Host Configuration Protocol (DHCP) phase and an Internet Protocol (IP) forwarding phase after completing the PPPoE connection phase, while updating said routing information items and said status information of the management table in accordance with progress of the communication procedures, and wherein said protocol processor transmits control packets of the PPPoE connection phase in the form of PPPoE frame having a PPPoE header, control packets of the LCP connection phase and the authentication phase in the form of PPPoE frame having the PPPoE header and a PPP header, and control packets of the DHCP phase and IP packets of the IP forwarding phase in the form of Ethernet frame having neither the PPPoE header nor the PPP header.

13. The user terminal according to claim 12, wherein said main processor stores a MAC address and a session ID notified from said packet forwarding apparatus during the PPPoE phase as said MAC address an said session ID in said management table, and an IP address assigned by an address management server located in the Layer 2 transit network and transferred by said packet forwarding apparatus during the DHCP phase as said IP address in said management table, and wherein said main processor generates IP packets each including said IP address as a source IP address in the IP forwarding phase, and said protocol processor transmits the IP packets to said access network through said line interface in the form of said Ethernet frame.

* * * * *